(12) United States Patent
Kato et al.

(10) Patent No.: US 7,738,779 B2
(45) Date of Patent: Jun. 15, 2010

(54) METHOD OF PROCESSING MULTIPLEXED PROGRAM DATA USING ENTRY POINTS AND TIME UNITS

(75) Inventors: Motoki Kato, Kanagawa (JP); Toshiya Hamada, Saitama (JP); Masanobu Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 1609 days.

(21) Appl. No.: 10/940,885

(22) Filed: Sep. 13, 2004

(65) Prior Publication Data

US 2005/0036763 A1 Feb. 17, 2005

Related U.S. Application Data

(63) Continuation of application No. 09/565,111, filed on May 4, 2000, now abandoned.

(30) Foreign Application Priority Data

May 6, 1999 (JP) ................................ 11-126164

(51) Int. Cl.
*H04N 7/26* (2006.01)
(52) U.S. Cl. ........................ 386/111; 386/45; 386/46; 386/110; 386/125
(58) Field of Classification Search .................. 386/95, 386/96, 111, 125, 126
See application file for complete search history.

(56) References Cited

U.S. PATENT DOCUMENTS

| | | | |
|---|---|---|---|
| 5,566,089 A | | 10/1996 | Hoogenboom |
| 5,596,564 A | | 1/1997 | Fukushima et al. |
| 5,621,840 A | * | 4/1997 | Kawamura et al. ............ 386/68 |
| 5,754,651 A | * | 5/1998 | Blatter et al. ................ 380/241 |
| 5,892,903 A | | 4/1999 | Klaus |
| 5,999,698 A | * | 12/1999 | Nakai et al. .................. 386/125 |
| 6,078,727 A | * | 6/2000 | Saeki et al. .................. 386/125 |
| 6,167,083 A | | 12/2000 | Sporer et al. |
| 6,356,567 B2 | | 3/2002 | Anderson et al. |
| 6,850,696 B1 | | 2/2005 | Van Gestel |

FOREIGN PATENT DOCUMENTS

| | | |
|---|---|---|
| EP | 0 749 244 | 12/1996 |
| EP | 0 903 738 | 3/1999 |
| JP | 11-155130 | 6/1999 |
| JP | 2000-333128 | 11/2000 |
| JP | 2001-167528 | 6/2001 |
| JP | 2002-538574 | 11/2002 |
| WO | WO 01/11626 A1 | 2/2001 |

* cited by examiner

*Primary Examiner*—Thai Tran
*Assistant Examiner*—Jamie J Atala
(74) *Attorney, Agent, or Firm*—Oblon, Spivak, McClelland, Maier & Neustadt, L.L.P.

(57) ABSTRACT

In a data processing apparatus used for a multi-channel digital television broadcasting system, coded streams are recorded on a recording medium in a high efficiency, and can be random-accessed in a high speed. The data processing apparatus is arranged by segmenting means for segmenting the entered coded stream with respect to a predetermined time unit, and first forming means for forming a time unit map indicative of an address of data every time unit of the coded stream which is segmented by the segmenting means.

19 Claims, 30 Drawing Sheets

ENTRY POINT MAP

| TIME UNIT | entry_point_flag | I_start_offset_from_time_unit_address |
|---|---|---|
| TU0 | 1 | a |
| TU1 | 0 | — |
| TU2 | 1 | b |

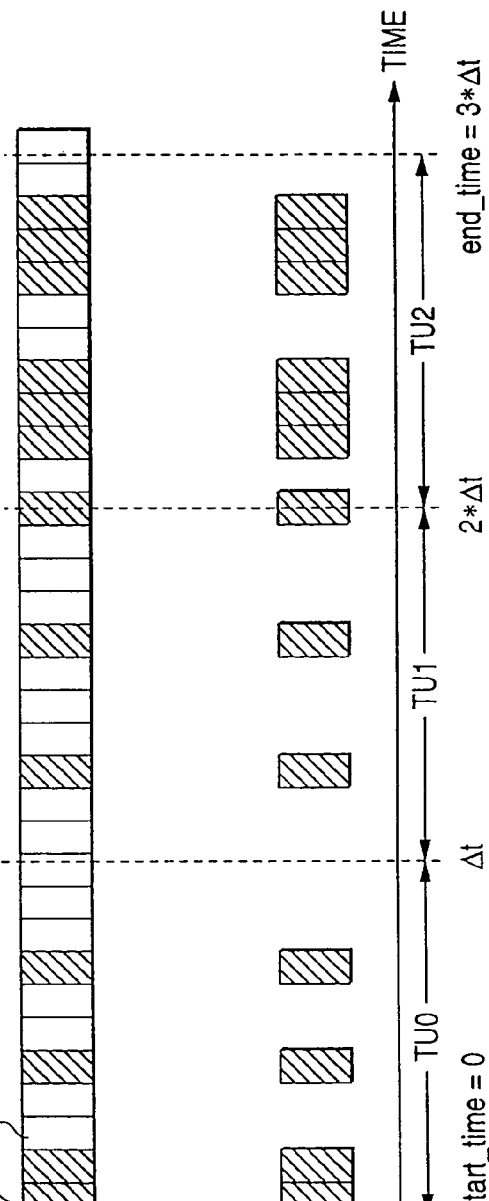
FIG. 3A INPUT TRANSPORT STREAM
FIG. 3B TRANSPORT PACKET OF SELECTED AV PROGRAM

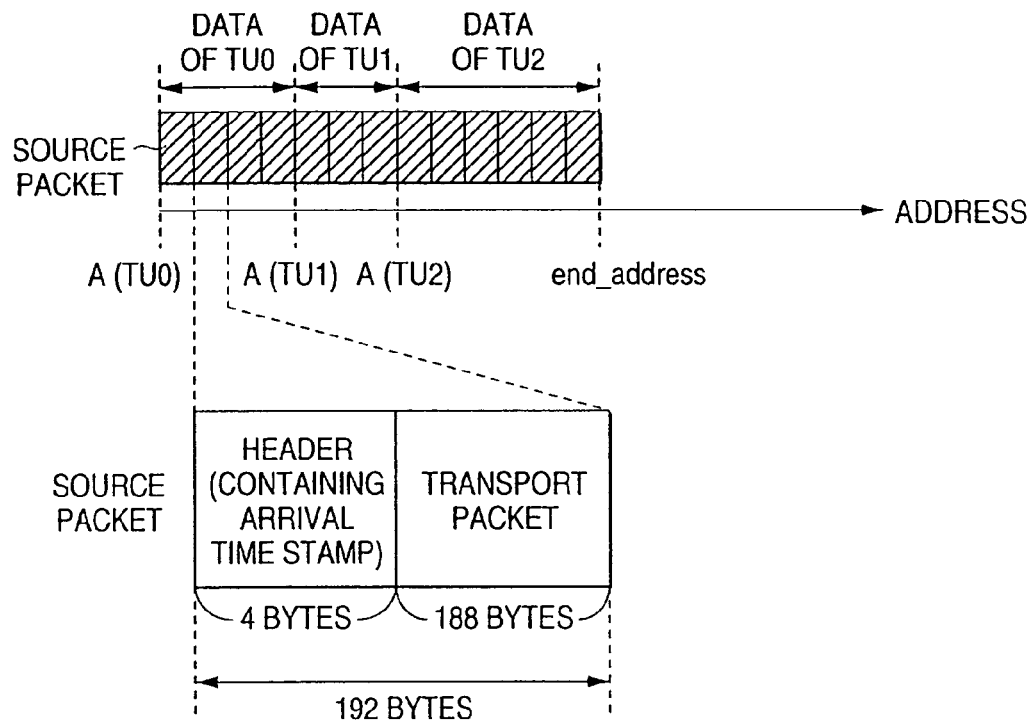

FIG. 6

TP_extra_header

| SYNTAX | NUMBER OF BITS | MNEMONICS |
|---|---|---|
| TP_extra_header () { | | |
| copy_permission_indicator | 2 | uimsbf |
| arrival_time_stamp | 30 | uimsbf |
| } | | |

FIG. 7

TIME UNIT MAP

| TIME UNIT | time_unit_address | delta_time_unit_address |
|---|---|---|
| TU0 | A (TU0) | A (TU1) − A (TU0) |
| TU1 | A (TU1) | A (TU2) − A (TU1) |
| TU2 | A (TU2) | end_address − A (TU2) |

ENTRY POINT MAP

| TIME UNIT | entry_point_flag | I_start_offset_from_time_unit_address |
|---|---|---|
| TU0 | 1 | a |
| TU1 | 0 | – |
| TU2 | 1 | b |

FIG. 11A
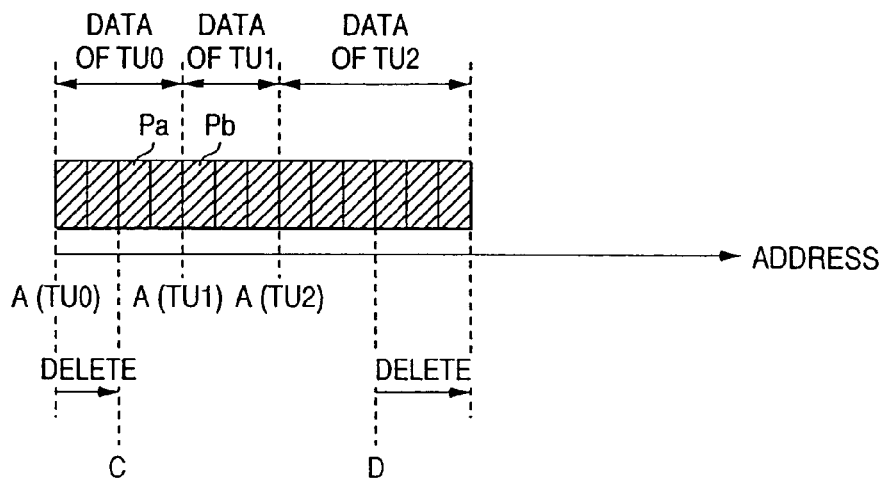
FIG. 11B
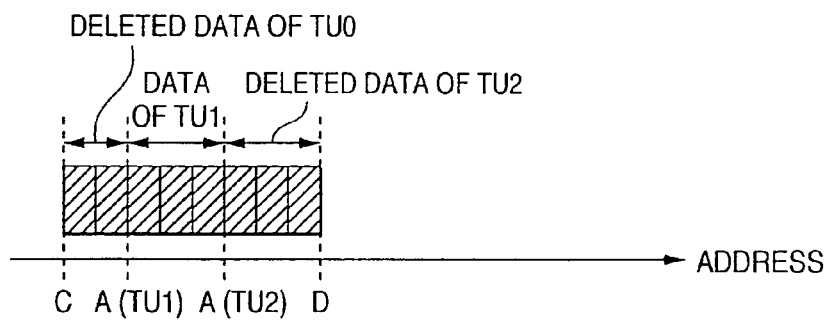
FIG. 12
TIME UNIT MAP AFTER PARTIAL DELETION
|  | delta_time_unit_address |
|---|---|
| TU0 | A (TU1) − C |
| TU1 | A (TU2) − A (TU1) |
| TU2 | D − A (TU2) |

FIG. 13

TimeUnitMapHeader ()

| | SYNTAX | BITS |
|---|---|---|
| 1 | TimeUnitMapHeader () { | |
| 2 | start_time | N1 |
| 3 | end_time | N2 |
| 4 | first_time_unit_size | N3 |
| 5 | time_unit_size | N4 |
| 6 | number_of_time_unit_entries | N5 |
| 7 | } | |

FIG. 14

TimeUnitMapData ()

| | SYNTAX | BITS |
|---|---|---|
| 1 | TimeUnitMapData () { | |
| 2 | for (i = 0 ; i < number_of_time_unit_entries ; i + + ) { | |
| 3 | delta_time_unit_address | N6 |
| 4 | } | |
| 5 | } | |

FIG. 15

EntryPointMapHeader ()

| | SYNTAX | BITS |
|---|---|---|
| 1 | EntryPointMapHeader () { | |
| 2 | number_of_programs | K1 |
| 3 | for (i = 0 ; i < number_of_programs ; i + + ) { | |
| 4 | program_number | 16 |
| 5 | parsed_program_flag | 1 |
| 6 | } | |
| 7 | | |
| 8 | for (i = 0 ; i < NUMBER_OF_ParsedPrograms ; i + + ) { | |
| 9 | MPEG_TS_program_map_section () | |
| 10 | } | |
| 11 | } | |

FIG. 16

EntryPointMapData ()

| | SYNTAX | BITS |
|---|---|---|
| 1 | EntryPointMapData () { | |
| 2 | for (i = 0 ; i < NUMBER_OF_ParsedPrograms ; i + + ) { | |
| 3 | for (j = 0 ; j < number_of_time_unit_entries ; j + + ) | |
| 4 | entry_point_flag | 1 |
| 5 | entry_point_data () | |
| 6 | } | |
| 7 | } | |

FIG. 17 entry_point_data ()

|   | SYNTAX | BITS |
|---|---|---|
| 1 | entry_point_data () { | |
| 2 | entry_point_time_stamp | K2 |
| 3 | I_start_offset_from_time_unit_address | K3 |
| 4 | I_end_offset_address | K4 |
| 5 | P1_end_offset_address | K5 |
| 6 | P2_end_offset_address | K6 |
| 7 | } | |

FIG. 18

EntryPointMapData ()

|   | SYNTAX | BITS |
|---|---|---|
| 1 | EntryPointMapData () { | |
| 2 | for (i = 0 ; i < number_of_time_unit_entries ; i++ ) { | |
| 3 | for (j = 0 ; j < NUMBER_OF_ParsedPrograms ; j++ ) | |
| 4 | entry_point_flag | 1 |
| 5 | entry_point_data () | |
| 6 | } | |
| 7 | } | |
| 8 | } | |

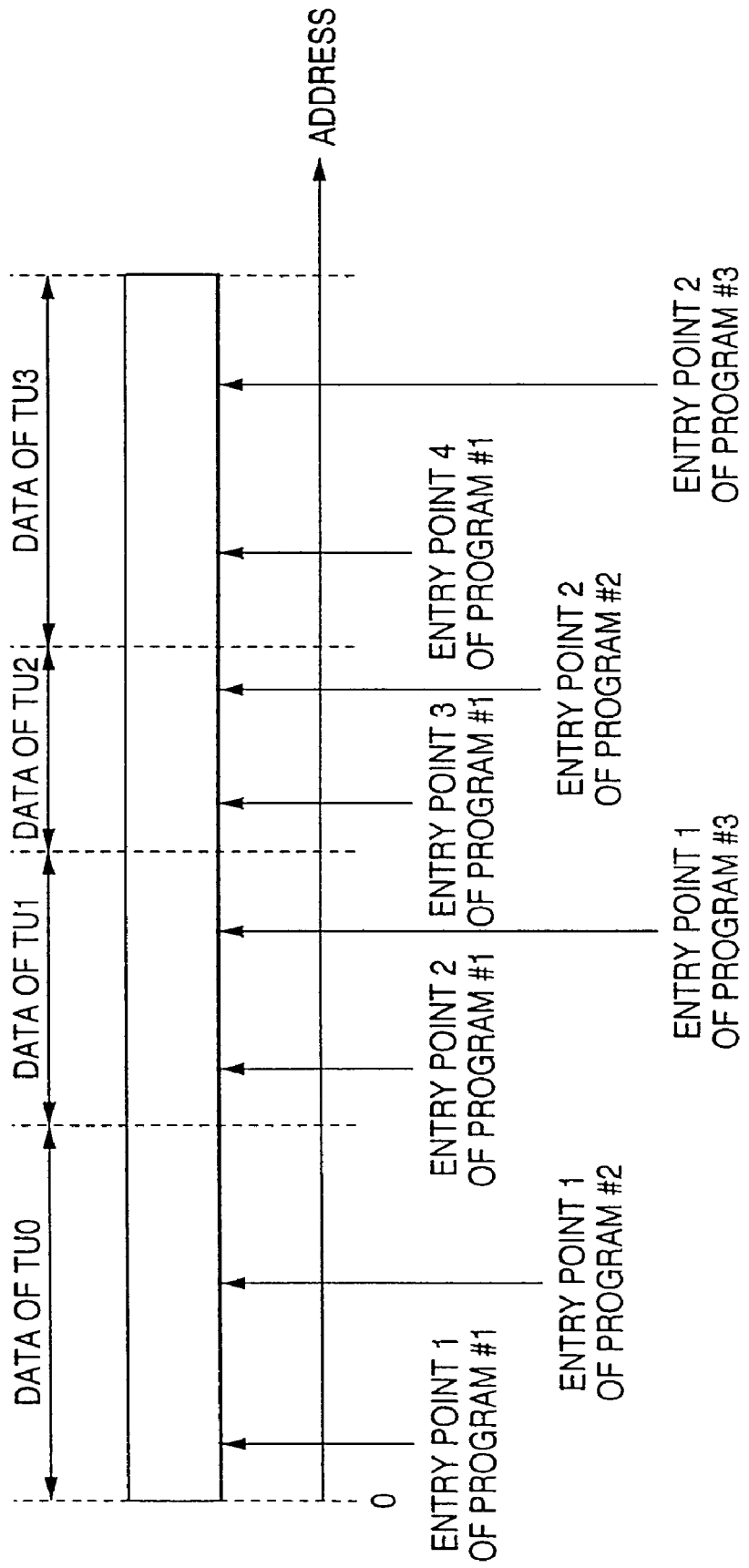

FIG. 20A

EntryPointMapData OF program #1

| TIME UNIT | entry_point_flag | entry_point_data |
|---|---|---|
| TU0 | 1 | entry_point_data#1-1 |
| TU1 | 1 | entry_point_data#1-2 |
| TU2 | 1 | entry_point_data#1-3 |
| TU3 | 1 | entry_point_data#1-4 |

FIG. 20B

EntryPointMapData OF program #2

| TIME UNIT | entry_point_flag | entry_point_data |
|---|---|---|
| TU0 | 1 | entry_point_data#2-1 |
| TU1 | 0 | – (dummy data) |
| TU2 | 1 | entry_point_data#2-2 |
| TU3 | 0 | – |

FIG. 20C

EntryPointMapData OF program #3

| TIME UNIT | entry_point_flag | entry_point_data |
|---|---|---|
| TU0 | 0 | – |
| TU1 | 1 | entry_point_data#3-1 |
| TU2 | 0 | – |
| TU3 | 1 | entry_point_data#3-2 |

FIG. 21

EntryPointMapData OF program #1, program #2 AND program #3

| TIME UNIT | PROGRAM NUMBER | entry_point_flag | entry_point_data |
|---|---|---|---|
| TU0 | #1 | 1 | entry_point_data#1-1 |
| | #2 | 1 | entry_point_data#1-2 |
| | #3 | 0 | – |
| TU1 | #1 | 1 | entry_point_data#1-2 |
| | #2 | 0 | – |
| | #3 | 1 | entry_point_data#3-1 |
| TU2 | #1 | 1 | entry_point_data#1-3 |
| | #2 | 1 | entry_point_data#2-2 |
| | #3 | 0 | – |
| TU3 | #1 | 1 | entry_point_data#1-4 |
| | #2 | 0 | – |
| | #3 | 1 | entry_point_data#3-2 |

FIG. 23

| SYNTAX | NUMBER OF BITS |
|---|---|
| TimeUnitMapHeader () { | |
| offset_SPN | 32 |
| offset_time | 32 |
| time_unit_size | 32 |
| number_of_time_unit_entries | 32 |
| } | |

FIG. 24

| SYNTAX | NUMBER OF BITS |
|---|---|
| TimeUnitMapData () { | |
| for ( k = 0 ; k < number_of_time_unit_entries ; k + + ) { | |
| RSPN_time_unit_start | 32 |
| } | |
| } | |

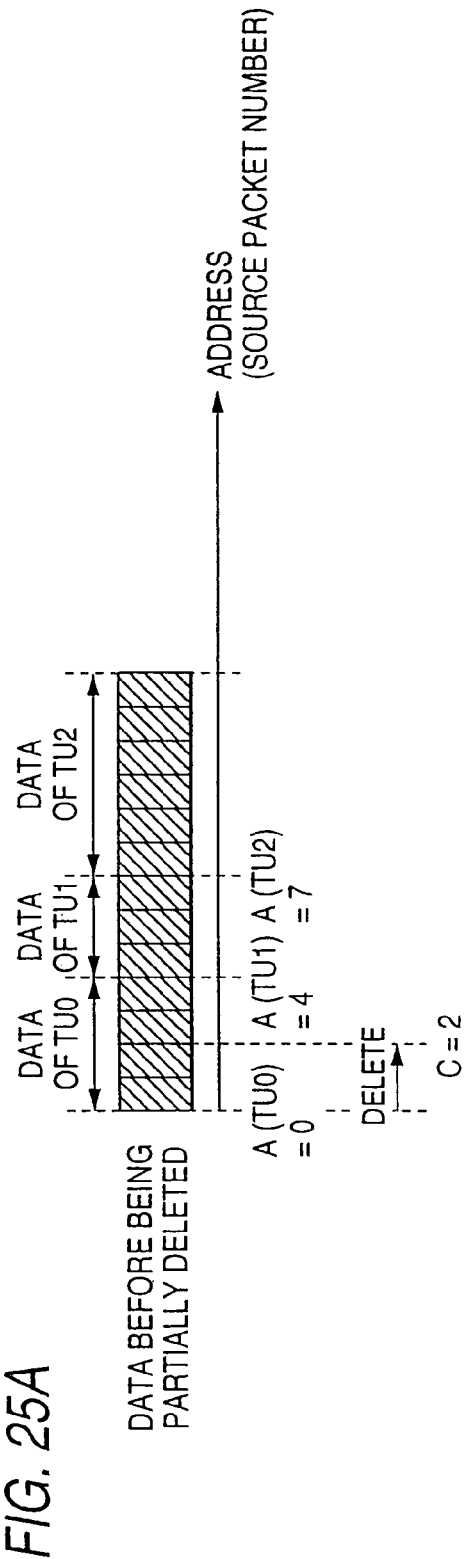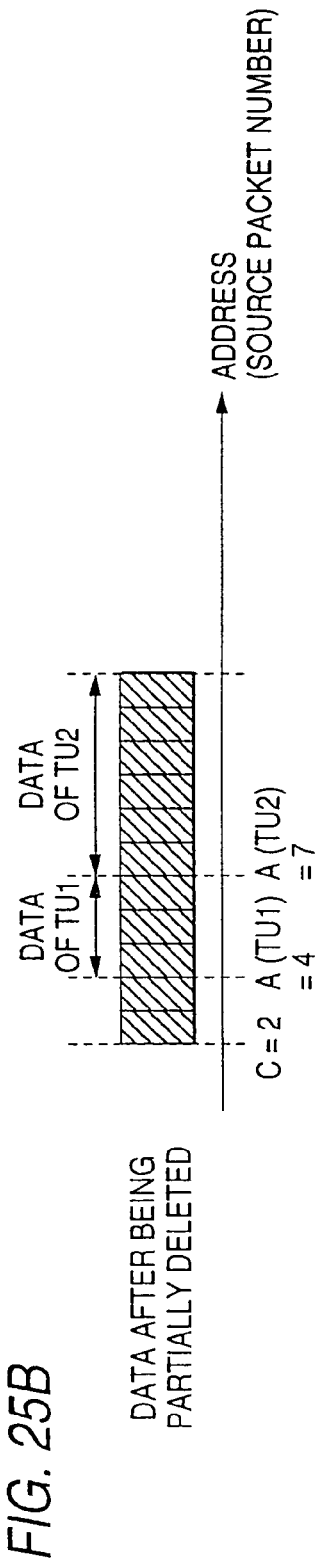

FIG. 26A

TIME UNIT MAP BEFORE BEING PARTIALLY DELETED

| | RSPN_time_unit_start | NOTE |
|---|---|---|
| TU0 | A (TU0) = 0 | ZEROTH TIME UNIT |
| TU1 | A (TU1) = 4 | FIRST TIME UNIT |
| TU2 | A (TU2) = 7 | SECOND TIME UNIT |

- offset_SPN = 0
- offset_time = 0 ; (STARTING TIME INSTANT OF TU0)
- time_unit_size = ΔT
- number_of_time_unit_entries = 3

FIG. 26B

TIME UNIT MAP AFTER BEING PARTIALLY DELETED

| | RSPN_time_unit_start | NOTE |
|---|---|---|
| TU1 | A (TU1) = 4 | NEW ZEROTH TIME UNIT |
| TU2 | A (TU2) = 7 | NEW FIRST TIME UNIT |

- offset_SPN = C (= 2)
- offset_time = ΔT ; (STARTING TIME INSTANT OF TU1)
- time_unit_size = ΔT
- number_of_time_unit_entries = 2

FIG. 38A
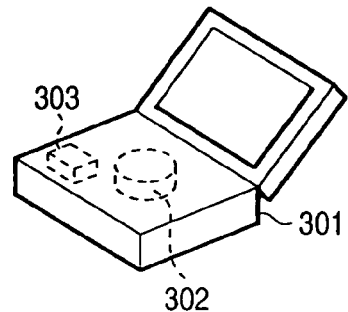
FIG. 38B
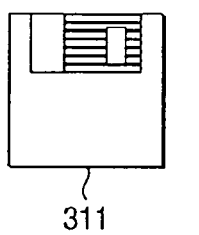
311
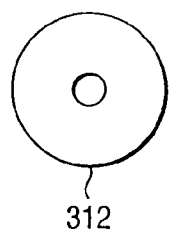
312
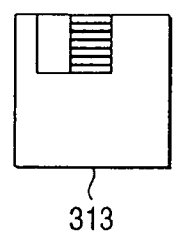
313
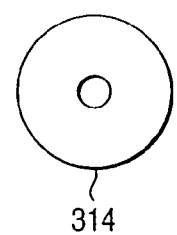
314
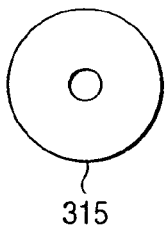
315
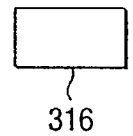
316
FIG. 38C
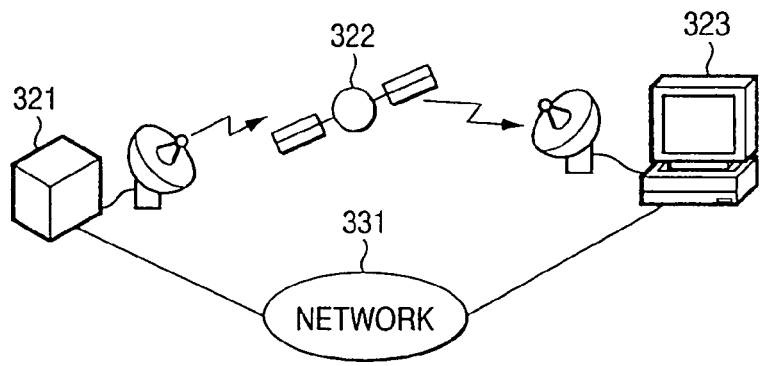

METHOD OF PROCESSING MULTIPLEXED PROGRAM DATA USING ENTRY POINTS AND TIME UNITS

This application is a continuation of U.S. application Ser. No. 09/565,111, filed May 4, 2000 now abandoned.

BACKGROUND OF THE INVENTION

1. Field of the Invention

The present invention generally relates to data processing method/apparatus, data reproducing method/apparatus, and a recording medium. More specifically, the present invention is directed to such data processing/recording methods/apparatuses capable of quickly random-accessing multiplexed program data by extracting feature point information from a coded transport stream.

2. Description of the Related Art

In multi-channel digital television broadcasting systems known as the European DVB (Digital Video Broadcast) system and the Japanese digital BS (Broadcast Satellite) broadcast system, the MPEG (Moving Picture Experts Group)-2 transport stream is used. A transport stream corresponds to such a stream in which a transport packet is continued. A transport packet corresponds to such a packet that, for instance, either an MPEG-2 video stream or an MPEG-1 audio stream is packeted. Either one program or a plurality of AV (Audio Visual) programs are multiplexed on a single transport stream which is transmitted by way of broadcasting electromagnetic waves. In general, AV programs of each channel are independently provided from each other.

As a consequence, when a transport stream transmitted in a broadcasting channel is directly received and then recorded by a home-use receiver, AV programs of all channels contained in this transmitted transport stream may be recorded at the same time. Also, when transport streams of AV programs of several channels selected from this broadcasted transport stream by a user are separated and then recorded, AV programs of an arbitrarily selected channel may be recorded at the same time.

FIG. 1 indicates an example of one conventional transport stream recording method. FIG. 1A shows such a transport stream on which a plurality of AV programs is multiplexed. In this drawing, an abscissa shows time. This time is segmented every time unit TUi (i=0, 1, 2, - - - ) having an interval "Δt". Either one AV program or a plurality of AV programs are selected from an input transport stream. The selected transport packets are indicated by using hatched lines. Generally speaking, as shown in FIG. 1B, these selected transport packets will appear at irregular timing, and thus, a total number of transport packets every time unit TUi is changed.

As indicated in FIG. 2, the transport packets which are selected every such a time unit TUi having the interval of Δt are recorded on a recording medium, while the intervals are shortened. At this time, these transport packets are recorded on this recording medium, while adding thereto time stamps indicative of time instants on the respective transport streams. This time stamp is similar to such a TSP_extra_header having a length of 4 bytes. That is, this 4-byte TSP_extra_header is added to the transport packet which is defined in, for instance, the DV (Digital Video) format (Specification Of Consumer-Use Digital VCRs using 6.3 mm magnetic tape in HD digital VCR conference), and PART7-DVB Specifications of Consumer-Use Digital VCR).

In FIG. 2, an abscissa indicates an address representative of a byte position of a recorded transport stream. When the transport stream having the variable bit rate shown in FIG. 1B is entered, a recording apparatus inserts dummy data into this input transport stream, and then records the resulting data at a fixed recording rate, as indicated in FIG. 2. As a consequence, a data amount with respect to a time elapse of the recorded transport stream may have a direct proportional relationship. In other words, assuming now that an amount of recorded data per a time unit is selected to be "x", a byte position of head data of an n-th (n=0, 1, 2 - - - ) time unit is equal to such a position obtained by multiplying x by n.

In this recording method, since the dummy data is inserted into the transport streams so as to achieve a constant recording rate, the recording efficiency of the transport stream is not so high. However, if such dummy data is not inserted, then the time elapses of the recorded transport streams is no longer directly proportional to the data amount of the file. As a result, in the case that such data located at a desired position on the time axis of the transport stream is accessed, there is a problem that the data access characteristic would be deteriorated.

Also, generally speaking, in an MPEG-2 video data stream, I picture are coded in an interval of approximately 0.5 seconds, and other pictures are coded as either P pictures or B pictures. As a consequence, when a video signal is reproduced in a high speed from a recording medium on which the MPEG-2 video data streams are recorded, such I pictures must be searched. However, in the case that the I pictures are reproduced by way of the random access manner from the recording medium on which the transport streams such as the digital broadcasting system are recorded, it is practically difficult to search the starting bytes of the I pictures in higher efficiencies. In other words, the syntax of the video streams which are read from the random byte positions of the transport streams recorded on the recording medium is analyzed, and thus, the starting bytes of either the I pictures or the audio frames are searched. As a consequence, lengthy search time of the I pictures is required in the worst case. Also, the high-speed random access reproducing operation cannot be carried out in response to the user input.

SUMMARY OF THE INVENTION

The present invention has been made to solve the above-explained problems, and therefore, is to provide such a data processing/recording methods/apparatuses capable of quickly random-accessing multiplexed program data by extracting feature point information from a coded transport stream.

To achieve the above-explained object, a data processing apparatus, according to the present invention, is featured by comprising: segmenting means for segmenting the entered coded stream with respect to a predetermined time unit; and first forming means for forming a time unit map indicative of an address of data every time unit of the coded stream which is segmented by the segmenting means.

In this data processing apparatus, the time unit map may save thereinto a packet number of a head packet every time unit as the address of the data with respect to each of the time unit.

In this data processing apparatus, the time unit map may save thereinto the address of the head data of the time unit, and an interval between addresses corresponding to a data amount contained within the time unit in correspondence with the address of the head data.

This data processing apparatus is further comprised of filing means for filing the time unit map in connection with the coded stream.

This data processing apparatus is further comprised of recording means for recording the data filed by the filing means on a recording medium.

In this data processing apparatus, the first forming means may change the content of the time unit map when the coded stream is edited.

This data processing apparatus is further comprised of second forming means for forming an entry point map subordinated to the time unit map, the entry point map indicating a position of an entry point of the coded stream.

In this data processing apparatus, the entry point map may include an interval of addresses defined from the head data of the time unit of the entry point.

In this data processing apparatus, the entry point may represent a head address of an I picture contained in the time unit; and the entry point map may contain any one of an interval defined from the head address of the I picture up to an end address of the I picture, and another interval defined from the head address of the I picture up to an end address of a P picture subsequent to the end address of the I picture, contained within a time unit including the I picture.

In this data processing apparatus, the entry point map may include a flag for indicating as to whether or not the entry point within the time unit is present.

In this data processing apparatus, in such a case that the coded stream is a coded stream produced by multiplexing a plurality of programs, the second forming means may form the entry point map every the program.

In this data processing apparatus, the second forming means changes the entry point map when the coded stream is edited.

A data processing method, according to the present invention, is featured by comprising: a segmenting step for segmenting the entered coded stream with respect to a predetermined time unit; and a forming step for forming a time unit map indicative of an address of data every time unit of the coded stream which is segmented by the process of the segmenting step.

A program of a first recording medium, according to the present invention, is featured by comprising: a segmenting step for segmenting the entered coded stream with respect to a predetermined time unit; and a forming step for forming a time unit map indicative of an address of data every time unit of the coded stream which is segmented by the process of the segmenting step.

A data reproducing apparatus, according to the present invention, is featured by comprising: first reproducing means for reproducing a time unit map indicative of an address of data every time unit of a coded stream, which is recorded on a recording medium; and second reproducing means for reproducing the coded stream recorded on the recording medium from an arbitrary position based upon the time unit map reproduced by the first reproducing means.

In the data reproducing apparatus, the first reproducing means may further reproduce an entry point map subordinated to the time unit map, which indicates a position of an entry point of the coded stream; and the second reproducing means may reproduce the coded stream recorded on the recording medium from an arbitrary position based upon both the time unit map and the entry point map, which are reproduced by the first reproducing means.

A data reproducing method, according to the present invention, is featured by comprising: a first reproducing step for reproducing a time unit map indicative of an address of data every time unit of a coded stream, which is recorded on a recording medium; and a second reproducing step for reproducing the coded stream recorded on the recording medium from an arbitrary position based upon the time unit map reproduced by the process of the first reproducing step.

A program of a second recording medium, according to the present invention, is featured by comprising: a first reproducing step for reproducing a time unit map indicative of an address of data every time unit of a coded stream, which is recorded on a recording medium; and a second reproducing step for reproducing the coded stream recorded on the recording medium from an arbitrary position based upon the time unit map reproduced by the process of the first reproducing step.

A recording medium, according to the present invention, is featured in that a coded stream, and a time unit map indicative of an address of data every time unit of the coded stream are recorded on the recording medium in the form of a file.

In the recording medium, the time unit map may save thereinto a packet number of a head packet every time unit as the address of the data with respect to each of the time unit.

In the recording medium, the time unit map may save thereinto the address of the head data of the time unit, and an interval between addresses corresponding to a data amount contained within the time unit in correspondence with the address of the head data.

In the recording medium, an entry point map subordinated to the time unit map and indicative of a position of an entry point of the coded stream may be further recorded on the recording medium.

In the recording medium, the entry point map may include an interval of addresses defined from the head data of the time unit of the entry point.

In the recording medium, the entry point may represent a head address of an I picture; and the entry point map may contain any one of an interval defined from the head address of the I picture up to an end address of the I picture, and another interval defined from the head address of the I picture up to an end address of a P picture subsequent to the end address of the I picture, contained within a time unit including the I picture.

In the recording medium, the entry point map may include a flag for indicating as to whether or not the entry point within the time unit is present.

In the recording medium, the entry point map may be formed every program.

In the data processing apparatus, the data processing method, and the program of the first recording medium, according to the present invention, the entered coded stream is segmented every time unit; and both the time unit map indicative of the address of the data every this time unit, and also the entry point map subordinated to the time unit map representative of the position of the entry point of the coded stream are produced.

In the data processing apparatus, the data processing method, and the program of the second recording medium, according to the present invention, both the time unit map indicative of the address of the data every time unit of the coded stream, and also the entry point map subordinated to the time unit map for indicating the position of the entry point of the coded stream are reproduced from the recording medium. Then, the coded stream is reproduced from an arbitrary position based upon these time unit map and entry point map.

In the recording medium of the present invention, the coded stream, and the time unit map indicative of the address of the data every time unit of the coded stream are recorded in the form of a file.

BRIEF DESCRIPTION OF THE DRAWINGS

For a better understanding of the present invention, reference is made of a detailed description to be read in conjunction with the accompanying drawings, in which:

FIG. 3 is an explanatory diagram for explaining a transport stream according to the present invention;

FIG. 4 is an explanatory diagram for explaining the transport stream to be recorded, according to the present invention;

FIG. 5 is a diagram for indicating syntax of a source packet;

FIG. 6 is a diagram for showing syntax of a TP_extra_header;

FIG. 7 is an illustration for indicating an example of a time unit map;

FIG. 11 is an explanatory diagram for explaining a deletion of data;

FIG. 12 is a diagram for indicating an example of a time unit map when data is deleted;

FIG. 13 is a diagram for indicating syntax of a TimeUnitMapHeader( );

FIG. 14 is a diagram for indicating syntax of a TimeUnitMapData( );

FIG. 15 is a diagram for showing syntax of an EntryPointMapHeader( );

FIG. 16 is a diagram for showing syntax of EntryPointData( );

FIG. 17 is a diagram for indicating syntax of entry_point_data ( );

FIG. 18 is a diagram for showing syntax of EntryPointMapData( );

FIG. 19 is an explanatory diagram for explaining an entry point of a transport stream file;

FIG. 20 is a diagram for indicating an example of EntryPointMapData( );

FIG. 21 is a diagram for indicating an example of EntryPointMapData( );

FIG. 23 is a diagram for showing syntax of a TimeUnitMapHeader( );

FIG. 24 is a diagram for showing syntax of TimeUnitMapData( );

FIG. 25 is an explanatory diagram for explanating a deletion of data;

FIG. 26 is a diagram for representing an example of a time unit map when data is deleted;

FIG. 38 is an explanatory diagram for explaining a recording medium according to the present invention.

DETAILED DESCRIPTION OF THE PREFERRED EMBODIMENTS

Figure 1:
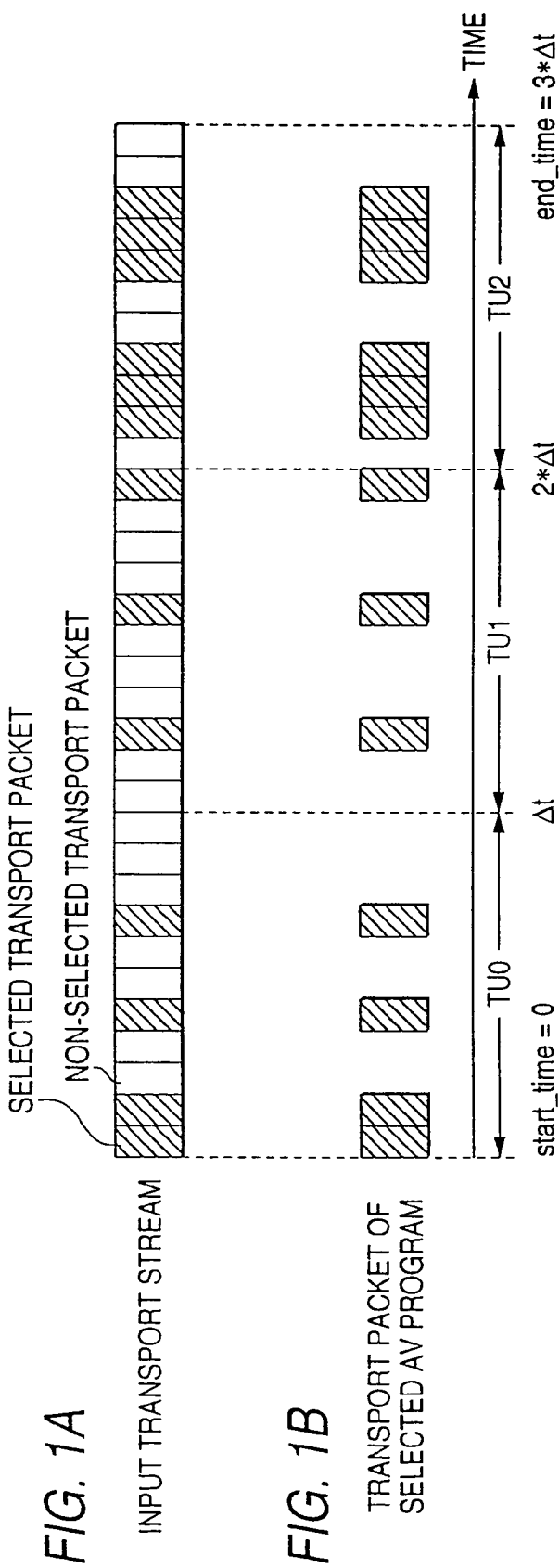
FIG. 1 is an explanatory diagram for explaining the packet of the conventional transport stream.
Figure 2:
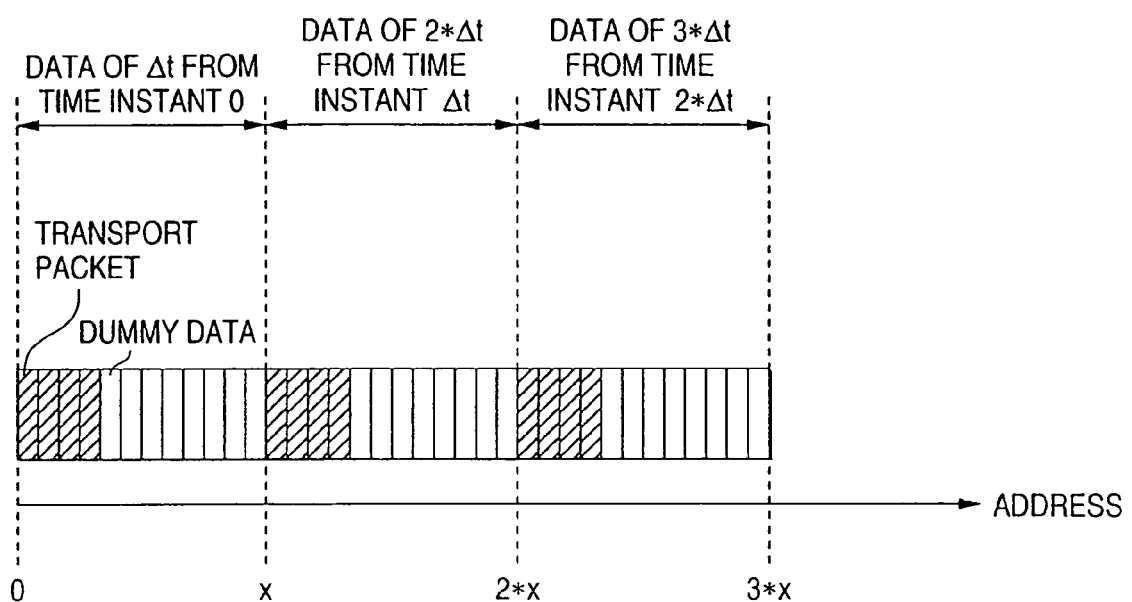
FIG. 2 is an explanatory diagram for explaining the conventional transport stream to be recorded.

Referring now to drawings, various preferred embodiments of the present invention will be described.

A description of the present invention is made of such a case that a coded stream is a multiplexed stream on which either one program or a plurality of programs are multiplexed. It should be noted that the present invention may be similarly applied to the coded stream which is an elementary stream such as an MPEG video stream.

BASIC IDEA OF THE PRESENT INVENTION

First of all, a basic idea of the present invention will now be described. That is, when a moving picture recording apparatus, according to the present invention, records a transport stream on a recording medium such as a disk and a tape, this moving picture recording apparatus segments time on a transport stream with respect to a predetermined time unit (unit time), and then calculates an address on a data stream every time unit. In this transport stream, either one or a plurality of programs are multiplexed. Then, a time unit map is formed. This time unit map indicates the addresses on the data stream every this time unit. Furthermore, an entry point map is formed. This entry point map indicates a position of an entry point (namely, random access point) with respect of each program of a transport stream to be recorded. The entry point map owns a structure followed to the time unit map. Now, this time unit map will now be explained as follows:

FIG. 3 represents a transport stream formed by that a plurality of AV programs are multiplexed. In this drawing, an abscissa shows time, and the time is segmented every time unit $TU_i$ (i=0, 1, 2, - - - ) having a time interval "$\Delta t$." Reference numeral "i" located subsequent to the character "TU" represents a time sequence (order) of this time unit TU. When a first original is recorded, the time lengths of all of the time units TU own the same interval values "$\Delta t$." A magnitude of the value $\Delta t$ is selected to be, for instance, 0.5 seconds. Either one AV program or a plurality of AV programs are selected from an input transport stream so as to be recorded. The selected transport packets are indicated by applying hatched lines thereto. In general, as shown in FIG. 3B, the selected transport packets appear at irregular timing, and a total number of transport packets every time unit TUi having the time interval Δt is changed. It should be understood that in an actual transport stream, considering now that a time length of a time unit is substantially equal to 0.5 seconds, an actual number of the transport packets contained in this time unit becomes very larger than that of the example shown in FIG. 3. However, in this embodiment mode, these transport packets are represented in a simple manner.

As indicated in FIG. 4, the selected transport packets are recorded on a recording medium (not shown), while intervals among these selected transport packets are shortened. At this recording operation, time stamps (Arrival Time Stamps) indicative of time instants on the transport stream are added to the respective transport packets. It is now assumed that an Arrival Time Stamp is similar to, for example, a TSP_extra_header having a length of 4 bytes, which is added to a transport packet defined by a DV format. In this specification, such a transport packet to which a header having a length of 4 bytes and containing this Arrival_Time_Stamp is added will be referred to as a "source packet." Since a transport packet owns a length of 88 bytes, this source packet owns a length of 192 bytes.

As shown in FIG. 5, syntax of a source packet is constituted by both a TP_extra_header ( ) and a transport_packet ( ). As shown in FIG. 6, this TP_extra_header ( ) is arranged by both a copy_permission_indicator and an arrival_time_stamp.

In FIG. 4, an abscissa is an address indicative of a byte position of a recorded transport stream. Also, the abscissa shows a head address of such a transport packet which is firstly inputted every time unit on the abscissa. In this example, 4 pieces of transport packets are contained in a time unit TU0, 3 pieces of transport packets are contained in a time unit TU1, and 6 pieces of transport packets are contained in a time unit TU2. A transport packet which is inputted by bridging two time units is contained in a front-sided time unit. It is also assumed that head addresses of firstly-entered transport packets of these time units TU0, TU1, TU2, or head addresses of source packets containing these transport packets are indicated as A(TU0), A(TU1), and A(TU2), respectively.

FIG. 7 indicates a time unit map, namely an example of a table of head addresses of data every time unit of a recorded transport stream. In this case, a time_unit_address indicates an address of head data of a time unit on a recorded stream. In the time unit map, data lengths delta_time_unit_address every time unit are formed in a table.

In this example, a data length of the time unit TU0 is expressed by a difference [A(TU1)–A(TU0)] between the head address A(TU1) of the time unit TU1 and the head address A(TU0) of the time unit TU0. Similarly, a data length of the time unit TU1 is expressed by a difference [A(TU2)–A(TU1)] between the head address A(TU2) of the time unit TU2 and the head address A(TU1) of the time unit TU1. Similarly, a data length of the time unit TU2 is expressed by a difference [end_address_A(TU2)] between the end address end_address of the time unit TU2 and the head address A(TU2) of the time unit TU2.

Figures 8, 9:
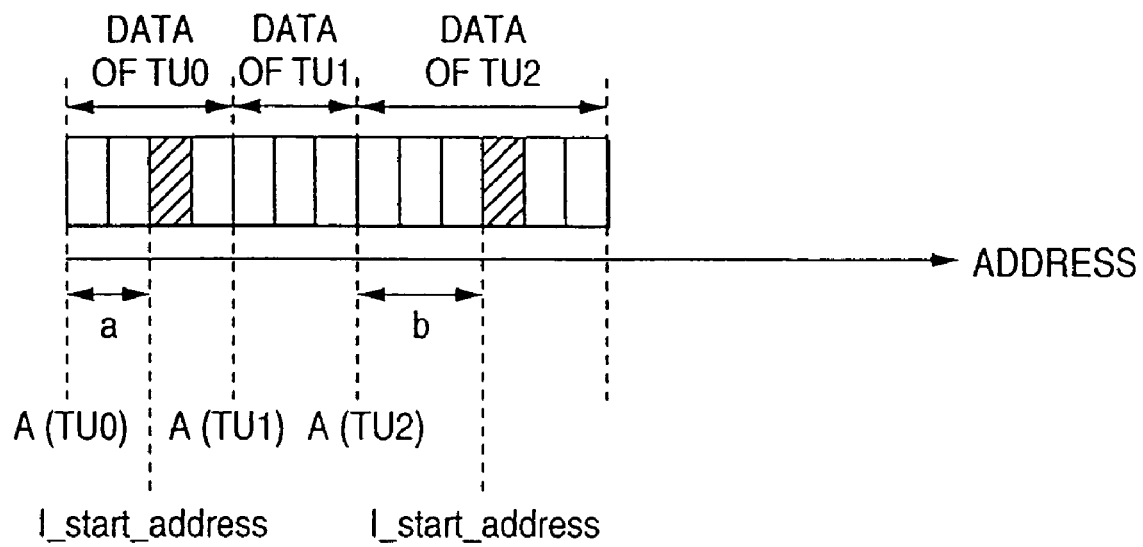
FIG. 8 is an explanatory diagram for explaining an offset address every time unit.
FIG. 9 is a diagram for representing an example of an entry point map.

Next, the above-explained entry point map is explained. A transport stream shown in FIG. 8 is such a transport stream similar to the transport stream shown in FIG. 4. In this case, it is now assumed that in a transport packet indicated by a hatched line, an entry point is commenced. Concretely speaking, in the entry point, it is so assumed that a sequence header and I picture data of MPEG video data are commenced. In such a case that an entry point is present in a preselected time unit, an offset address is calculated which is defined from a head address of data of this predetermined time unit up to an address of an entry point. In other words, in the example of FIG. 8, entry points (I picture) are present in the time unit TU0 and the time unit TU2. Thus, in the time unit TU0, an interval "a" is calculated as an offset address. This interval "a" is defined from a head address A(TU0) of this time unit TU0 up to a head address I_start_address of the I picture. At the same time, in the time unit TU2, an interval "b" is calculated as an offset address. This interval "b" is defined from a head address A(TU2) of this time unit TU2 up to a head address I_start_address of the I picture.

FIG. 9 indicates an entry point map, namely an example of a table of an offset address up to an entry point every time unit. A flag entry_point_flag is set to "1" when an entry point is present in the corresponding time unit "TUi." This flag entry_point_flag is set to "0" when an entry point is not present in the corresponding time unit. As to such a time unit whose entry_point_flag is "1", an offset address I_start_offset_from_time_unit_address is calculated by the following formula, which is defined from a head address time_unit_address of data in this time unit up to an address I_start_address of an entry point:

$$I\_start\_offset\_from\_time\_unit\_address = I\_start\_address - time\_unit\_address$$

Also, with respect to each of the entry points, a calculation is made of: an end address I_end_address of I picture data of the entry point; an end address P1_end_address of one next P picture, or one next I picture of the I picture of the entry point; and an end address P2_end_address of two next P picture, or two next I picture of the I picture of the entry point in accordance with the below-mentioned formula:

$$I\_end\_offset\_address = I\_end\_address - I\_start\_address$$

$$P1\_end\_offset\_address = P1\_end\_address - I\_start\_address$$

$$P2\_end\_offset\_address = P2\_end\_address - I\_start\_address$$

Figure 10:
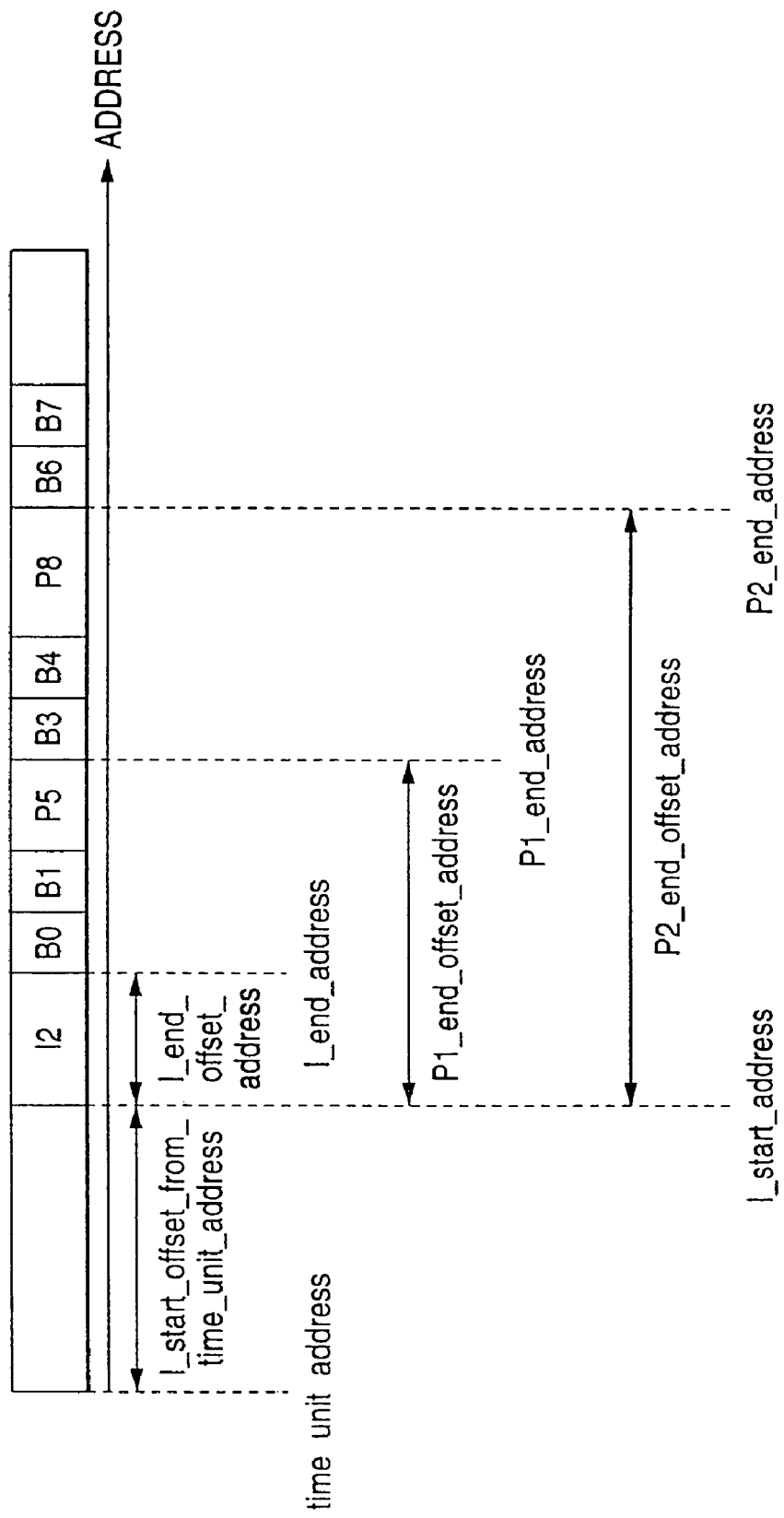
FIG. 10 is an explanatory diagram for explaining entry point data.

FIG. 10 shows a concrete example of these addresses. That is, FIG. 10 represents MPEG video data starting from a head of a preselected time unit. In this drawing, symbols I, P, B indicate an I picture, a P picture, and a B picture, respectively. Also, suffixed numerals show a display order of these pictures. In this time unit, there is an I picture of an entry point indicated by "I2." Also, a P picture subsequent to the I picture I2 corresponds to "P5", and a P picture two subsequent to this I picture corresponds to "P8." At this time, the addresses of I_start_offset_from_time_unit_address; I_end_offset_address; P1_end_offset_address; and P2_end_offset_address calculated by the above-explained formula establish such a relationship as indicated in this drawing.

In other word, the address I_end_offset_address is assumed as such a value obtained by subtracting the starting address I_start_address of the I picture I2 from the end address I_end_address of the I picture I2. Also, the address P1_end_offset_address is assumed as such a value obtained by subtracting the starting address I_start_address of the I picture I2 from the end address P1_end_address of the P picture P5. Further, the address P2_end_offset_address is assumed as such a value obtained by subtracting the starting address I_start_address of the I picture I2 from the end address P2_end_address of the P picture P8.

The address I_start_offset_from_time_unit_address is assumed as such a value obtained by subtracting the head address time_unit_address of the data of the time unit from the address I_start_address of the entry point.

It should be noted that when a plurality of programs are contained in the transport stream to be recorded, the information of the entry points is discriminated from each other every program to be formed. Considering such a case that the entry point data could not be prepared for all of the programs, the entry point map contains such information (parsed_program-_flag) for indicating as to whether or not the entry point data is present every program.

In the case that the transport streams recorded on the recording medium are edited, the time unit map thereof is changed (updated). Next, this changing method will now be explained. FIG. 11A represents an example of such a case that both the 2 head packets of the transport stream shown in FIG. 4 and the 3 end packets thereof are deleted. FIG. 11B shows such a transport stream produced after the packets are partially deleted in this manner. FIG. 12 represents a time unit map of the transport stream shown in FIG. 11B. When the data contained in a halfway of the time unit are deleted in this manner, since a time length (first_time_unit_size) of the first time unit TU0 is changed, this is rewritten. In the case of FIG. 11B, the time length of the time unit TU0 is changed into a difference value between a time stamp of a head packet Pb of the time unit TU1 and a time stamp of a head packet Pa of the time unit TU0 after deletion. Also, as indicated in FIG. 12, an address delta_time_unit_address of the time unit TU0 is updated as a difference value (A(TU1)-C) between an address A(TU1) of the head packet Pb of the time unit TU1 and an address C of the head packet Pa of the time unit TU0 after deletion. When the time unit map is changed, the entry point map related to this time unit map is also changed.

FIG. 13 and FIG. 14 indicate an example of syntax of the above-explained time unit. FIG. 13 and FIG. 14 represent a header portion [TimeUnitMapHeader( )] and a data portion [TimeUnitMapData( )] of the time unit map, respectively. When the time unit map is recorded as a file, both the header portion and the data portion may be recorded as a single file, or as separate files, respectively. Symbol "start_time" and symbol "end_time" of TimeUnitMapHeader( ) denote a starting time instant and an end time instant of this time unit map, respectively. For instance, these symbols indicate a recording start time instant and a recording end time instant when a certain transport stream is recorded. Symbol "first_time-_unit_size" indicates a time length of a first time unit. Symbol "time_unit_size" shows a time length of a second time unit, or of a time unit after the second time unit. Symbol "number-_of_time_unit_entries" represents a total number of time units contained in the transport stream. The addresses delta-_time_unit_address (see FIG. 7) whose number is indicated by this symbol "number_of_time_unit_entries" are written in the data unit TimeUnitMapData( ).

Also, a first example of the syntax of the above-described entry point map is indicated in FIG. 15 to FIG. 17. FIG. 15 shows a header portion [EntryPointMapHeader( )] of an entry point map, and FIG. 16 indicates a data portion [EntryPoint-MapData( )] of an entry point map. FIG. 17 further indicates syntax of entry_point_data( ) shown in FIG. 16. When the entry point map is recorded as a file, both the header portion and the data portion may be recorded as a single file, or separate files, respectively.

Symbol "number_of_programs" of the header EntryPoint-MapHeader( ) shown in FIG. 15 indicates a total number of programs contained in the transport stream. There is such information indicating as to whether or not an entry map table is present with respect to each of programs to be recorded in lines of this syntax from a third line to a sixth line. The program number program_number of the fourth line is such an information specifying (discriminating) a program, and is equal to information which is written in a PMT (Program Map Table) of the corresponding program. The flag parsed_pro-gram_flag of the fifth line is such a flag indicating as to whether or not there is entry point data of this program.

The information about PMTs of the respective programs to be recorded are continued from an eighth line to a tenth line. Symbol "MPEG2_TS_program_map_section( )" indicates a PMT which is extracted from a transport stream to be recorded, and is defined based upon the MPEG-2 system rules. In this case, symbol "NUMBER_OF_Parsed_Pro-grams" indicates a total number of programs whose parsed-_program_flag is equal to "1". A sequence order of data appeared in a loop of the number NUMBER_OF_ParsedPro-grams in the eight line corresponds to a sequence order of the numbers program_number whose parsed_program_flag is equal to "1" in a loop of the program number_of programs in the third line.

In EntryPointMapData( ) of FIG. 6, data of an entry point as to each of programs to be recorded is described. As a parameter of an entry point with respect to one time unit, there are both "entry_point_flag" and "entry_point_data( )." As indicated in FIG. 17, the contents of entry_point_data( ) as to one time unit are "entry_point_time_stamp", "I_start_offset-_from_time_unit_address", "I_end_offset_address", "P1_end_offset_address", and "P2_end_offset_address." In this case, entry_point_time_stamp is calculated based upon either a time instant at a stream of a transport packet of an entry point or a PTS (Presentation Time Stamp) of an I picture of an entry point. PTS corresponds to such information added to a header of a PES packet defined in the MPEG-2 system rules.

FIG. 18 shows a second example of the syntax of the above-explained entry point map. Both a structure of Entry-PointMapHeader( ) and a structure of entry_point_data( ) are similar to those of the above-explained first example as indicated in either FIG. 15 or FIG. 17. As apparent from a comparison between FIG. 18 and FIG. 16, data arrangement orders of entry points as to each of programs of the second example are different from those of the first example shown in FIG. 16.

Next, data arrangement orders of entry maps are shown in the first example and the second example under the below-mentioned conditions. In this case, as shown in FIG. 19, it is now assumed that 3 pieces of programs (program #1, program #2, program #3) contained in a transport stream are multiplexed, and an entry point of each of programs is present every time unit TUi (i=0, 1, 2, 3). In this case, the respective parameters are given as follows:
  number_of_time_unit_entries=4
  number_of_programs=3
  program_number=1: parsed_program_flag=1
  program_number=2: parsed_program_flag=1
  program_number=3: parsed_program_flag=1
  NUMBER_OF_ParsedPrograms=3

FIG. 20 shows an entry point map in the case of the first example (example of FIG. 16). In this case, the lists of the entry point data every program are formed in a separate form. In other words, as shown in FIG. 20A, EntryPointMapData of the program program #1 is arranged as follows. Since entry-_point_data #1-1 through entry_point_data #-4 are present as entry_point_data in each of the time units TU0 to TU3, each of the flags entry_point_flag is set to "1", and furthermore, entry_point_data #1-1 through entry_point_data #1-4 are described in the time units TU0 to TU3.

It should be noted that symbol "entry_point_data #A-B" indicates entry_point_data( ) as to a B-th entry point of program_number=A.

As indicated in FIG. 20B, EntryPointMapData of the program #2 is arranged as follows. Since there is no entry point- _data in the time units TU1 and TU3, the flag entry_point_flag thereof is set to "0". To the contrary, since both entry_point_data. #2-1 and entry_point_data #2-2 are present in each of the time units TU0 And TU2, the flag entry_point_flag thereof is set to "1", and furthermore, entry_point_data corresponding thereto, namely both entry_point_data #2-1 and entry_point_data #2-2 are described in the time units TU0 and TU2.

In addition, as to EntryPointMapData of program #3, since there is no entry_point_data in the time units TU0 and TU2, the flag entry_point_flag thereof is set to "0". To the contrary, since both entry_point_data #3-1 and entry_point_data #3-2 are present in each of the time units TU1 and TU3, the flag entry_point_flag thereof is set to "1", and furthermore, entry_point_data corresponding thereto, namely both entry_point_data #3-1 and entry_point_data #3-2 are described in the time units TU1 and TU3.

These entry_point_flag and entry_point_data are described in EntryPointMapData.

FIG. 21 indicates an entry point map in the case of the second example (example of FIG. 18).

In this case, entry point data of each of programs are arranged in a time order form every time unit, and a list of these entry point data constitutes a single form. In other words, in the time unit TU0, three sets of programs program #1 to program #3 are described, and entry_point_data corresponding to entry_point_flag is described in each of these three programs In this example, since entry_point_data is not present in program #3, the flag entry_point_flag thereof is set to "0." To the contrary, since both entry_point_data #1-1 and entry_point_data #2-1 are present as to program #1 and program #2, the flag entry_point_flag thereof is set to "1."

Also, in other time units TU1 to TU3, both entry_point_flag and entry_point_data are described in each of programs #1 through program #3.

Figure 22:
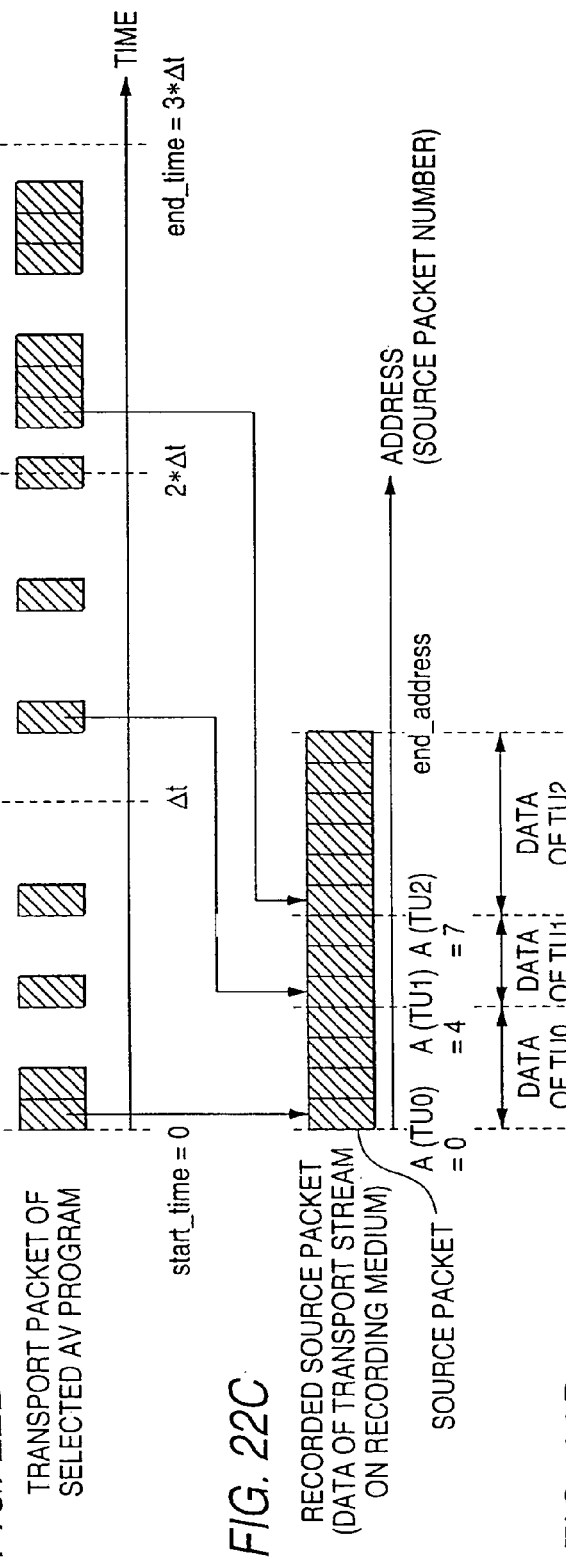
FIG. 22 is an explanatory diagram for explaining a transport stream according to the present invention.

Referring now to FIG. 22, another example of a time unit map will be explained. FIG. 22A and FIG. 22B show arrangements similar to those of FIG. 3A and FIG. 3B as explained above. Also, similar to FIG. 4, FIG. 22C shows source packet data recorded on the recording medium. A relationship between a transport packet and a source packet is represented in FIG. 4. In FIG. 22C, an abscissa indicates the number of recorded source packet. The source packet number corresponds to an order at which the source packets are recorded. This source packet number is commenced from zero, and is sequentially incremented by 1. The head addresses A(TU0), A(TU1), and A(TU2) of the data every time unit become 0, 4, 7, respectively, while being counted in the unit of source packet number.

FIG. 22D indicates a time unit map, namely, an example of a table for a head address of data every time unit of a recorded transport stream. In this example, symbol "RSPN (Relative Source Packet Number)_time_unit_start" shows an address of head data of a time unit on the recorded stream. In the time unit map, the addresses RSPN_time_unit_start are formed in a table in the order of time units from the head of the recorded transport stream. In the case of FIG. 22D, the address values are arranged in the order of A(TU0), A(TU1), A(TU2).

Next, an example of syntax of the above-explained time unit map are indicated in FIG. 23 and FIG. 24. FIG. 23 and FIG. 24 indicate a header portion [TimeUnitMapHeader( )] of the time unit map, and a data portion [TimeUnitMapData( )] thereof. When the time unit map is recorded as a file, both the header portion and data portion may be recorded as a single file, or may be alternatively recorded as separate files.

Symbol "offset_SPN" of the header portion TimeUnitMapHeader( ) shown in FIG. 23 indicates the number of the first source packet of the recorded transport stream. In this embodiment mode, symbol "RSPN_time_unit_start" is expressed by a relative source packet number with respect to the source packet number offset_SPN. An initial value of the source packet number offset_SPN when the time unit map is firstly formed is equal to zero. The next symbol "offset_time" represents a starting time instant of this time unit map, and indicates a starting time of a first time unit.

Symbol "time_unit_size" shows a time length (size) of the time unit of this time unit map.

Symbol "number_of_time_unit_entries" denotes a total number of time units within the recorded transport stream.

The addresses RSN_time_unit_start (FIG. 22D) whose number is indicated by the time unit number number_of_time_unit_entries are written in the data portion TimeUnitMapData( ) of FIG. 24.

Next, a description will now be made of a method for changing (updating) the above-explained time unit map in the case that the recorded transport stream is edited. FIG. 25A indicates such an example that two head packets of the transport stream shown in FIG. 22C are deleted, namely the packets defined from the head packet up to a source packet at an address indicated by "C" are deleted. FIG. 25B indicates a transport stream formed after the packets are partially deleted in this manner.

FIG. 26 shows time unit maps of transport streams in the case of FIG. 25A and FIG. 25B. As seen from this drawing, when the data located at the head portion of the time unit are deleted, data of RSPN_time_unit_start for referring to the time unit containing the deleted data portion is deleted. In the case of FIG. 26B, the data of RSPN_time_unit_start of the time unit TU0 is deleted. In connection thereto, the number "number_of_time_unit_entries" is decremented by a total number of data of the deleted RSPN_time_unit_start.

Also, the above-described offset_SPN and offset_time are changed. In the case of FIG. 26A, offset_SPN is equal to zero, and also the starting time instant (namely 0) of the time unit TU0 is set to offset_time. In the case of FIG. 26B, offset_SPN is changed into the number C (=2) of the original source packet for such a source packet which newly becomes a head packet. Also, such a time unit that offset_time newly becomes a head is changed, namely, in this example, this time unit is changed into the original starting time "ΔT", of the time unit TU1. It should also be noted that time_unit_size is not changed before/after the editing operation is carried out.

When the time unit map is changed, the entry point map related to this time unit map is also changed.

Arrangement of Moving Picture Recording Apparatus

Figure 27:
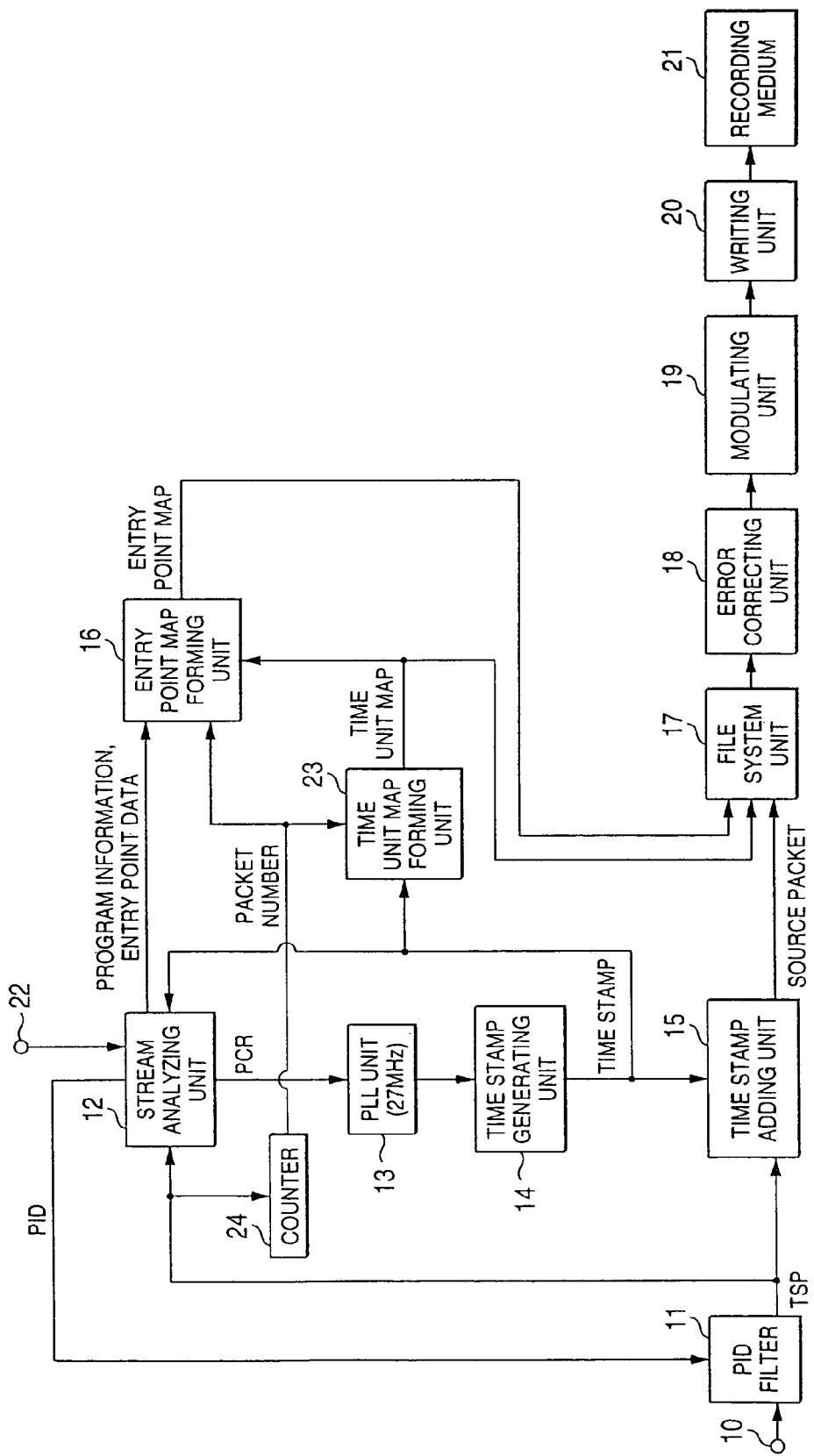
FIG. 27 is a schematic block diagram for showing a structural example of a moving picture recording apparatus to which the present invention is applied.

Next, FIG. 27 schematically shows a structural example of a moving picture recording apparatus 1 according to a preferred embodiment mode of the present invention. This moving picture recording apparatus 1 produces the above-explained table from an inputted transport stream, and records this produced table on the recording medium in combination with this input transport stream.

Either one AV program or a plurality of AV programs are multiplexed on a transport stream entered from a terminal 10 of this moving picture recording apparatus 1. On the other hand, a channel (service name) of such an AV program selected by a user interface is entered. In this case, a total number of selected channels may be selected to be 1, or more.

A PID filter 11 filters out a transport packet of a PID (Packet ID) designated by a stream analyzing unit 12 from the entered transport stream. Symbol "PID" indicates a code having a length of 13 bits, which is located at a fixed position of a header of the transport packet. This PID code represents a type of data stored in a payload of this transport packet.

First, the PID filter 11 filters out a transport packet of a PAT (Program Association Table) in which PID=0x0000. In this PAT, a PID of a transport packet of a PMT (Program Map Table) of each of the programs which are multiplexed on the transport stream is described. The transport packet of the PAT filtered out from the PID filter 11 is entered into the stream analyzing unit 12.

A counter 24 counts a total number of packets defined from a head packet of a transport stream to be recorded up to a present packet. Then, the counter 24 outputs the present packet number to both a time unit map forming unit 23 and an entry point map forming unit 16.

The stream analyzing unit 12 extracts a PCR (Program Clock Reference) from such a transport packet which transfers this PCR, and then supplies the extracted PCR to a PLL unit 13. In such a case that there are plural PIDs of the transport packets which transfer PCRs, the stream analyzing unit 12 extracts PCR from any one of these PIDs of transport packets. The PLL unit 13 produces a clock having a frequency of 27 MHz in synchronism with the entered PCR, and then outputs this produced clock to a time stamp generating unit 14.

The time stamp generating unit 14 counts the entered clock, and generates a time stamp (Arrival_Time_Stamp) corresponding to this count value. Assuming now that the time stamp of the firstly recorded transport packet is set to zero, this counted time stamp may indicate time lapse after this transport stream is recorded. This time stamp is supplied to the stream analyzing unit 12, a time stamp adding unit 15, and a time unit map forming unit 23.

The time stamp adding unit 15 adds a header to the transport packet entered from the PID filter 11, and outputs the source packet (see FIG. 4) to a file system unit 17. This header contains a time stamp indicative of an arrival time instant of this entered transport packet.

The time unit map forming unit 23 forms the above-explained time unit map based upon both the packet number entered from the counter 24 and the time stamp entered from the time stamp generating unit 14. The formed time unit map is outputted to both an entry point map forming unit 16 and the file system unit 17.

The stream analyzing unit 12 supplies the below-mentioned program information with respect to each of the programs to the entry point map forming unit 16:

(1) program_number of a program;

(2) a PID of a transport packet of a PMT of a program;

(3) both a PID and stream_type of a transport packet of video data which constitutes a program;

(4) both a PID and stream_type of a transport packet of audio data which constitutes a program; and (5) a PID of a PCR of a program.

In this program information, symbol "stream_type" implies a content written in a PMT. In the case of video data, this symbol "stream_type" indicates a stream type of video data such as MPEG-2 type video data and MPEG-1 type video data. In the case of audio data, this symbol "stream_type" denotes a stream type of audio data such as MPEG-1/AC-3 type audio data.

Also, the stream analyzing unit 12 forms entry point data of a stream to be recorded, and then inputs the formed entry point data to the entry point map forming unit 16. The content of this entry point data is indicated in FIG. 17. In such a case that the time stamp of the entry point is equal to a PTS of the entry point, since the PTS is derived from the input stream by the stream analyzing unit 12, the time stamp formed by the time stamp generating unit 14 need not be entered into the stream analyzing unit 12.

The entry point map forming unit 16 processes the entry point data to form an entry point data table every program, so that the above-described entry point map is formed and then is outputted to the file system unit 17.

Recording Operation of Moving Picture Recording Apparatus

Figure 28:
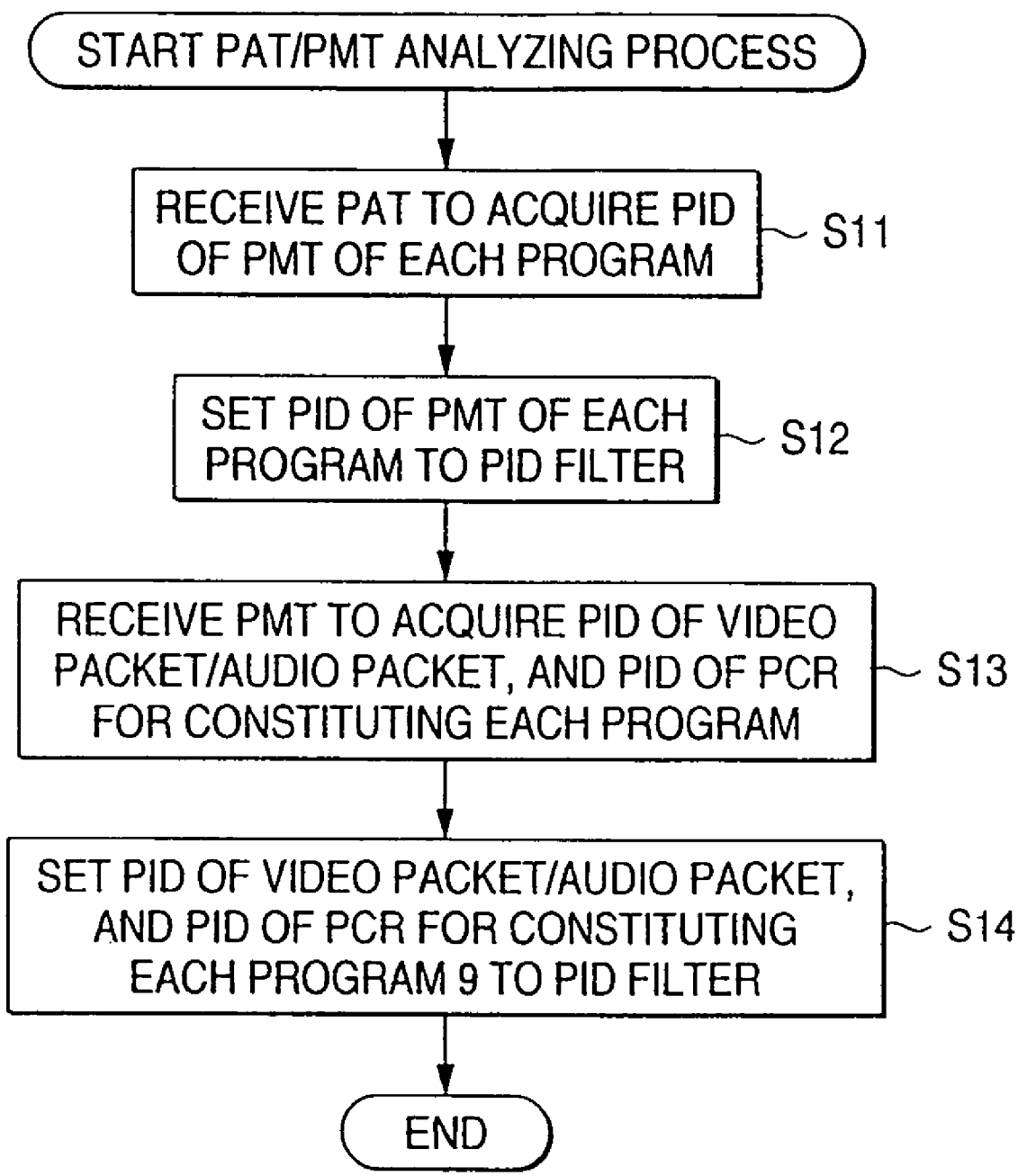
FIG. 28 is a flow chart for describing a recording operation of the moving picture recording apparatus shown in FIG. 27.

A description will now be made of recording operations of the above-explained moving picture recording apparatus. When a transport stream is entered from the terminal 10, the PID filter 11 employed in the moving picture recording apparatus filters out such a transport packet containing a PID (namely, PID=0x0000), and then outputs this extracted transport packet to the stream analyzing unit 12. At this time, the stream analyzing unit 12 executes a process operation described in a flow chart of FIG. 28.

When the stream analyzing unit 12 receives the transport packet of PID=0x0000 from the PID filter 11 at a step S11, the stream analyzing unit 12 acquires from a PAT thereof, a PID of a transport packet of a PMT of each of programs which is instructed via a terminal 22.

At a step S12, the stream analyzing unit 12 sets the PID of the PMT of each of the programs to the PID filter 11. When this PID filter 11 derives such a transport packet having PIDs of these PMTs, this transport packet is outputted to the stream analyzing unit 12.

At a step S13, the stream analyzing unit 12 receives the transport packet of a PMT from the PID filter 11. In this PMT, a PID of such a packet is written. That is, this packet transfers both the PID and a PCR (Program Clock Reference) of a transport packet which owns both a video stream and an audio stream, as a payload. These video and audio streams constitute this program. The stream analyzing unit 12 acquires the PID of such a packet which transfers both the PID and the PCR of a transport packet which owns the video stream and the audio stream as the payload at this step. These video stream and audio stream constitute each of the programs selected by a user interface.

At a step S14, the stream analyzing unit 12 sets to the PID filter 11, the PID of such a packet which transfers both the PID and the PCR of the transport packet which owns the video stream and the audio stream as the payload. These video stream and audio stream constitute each of the programs selected by the user interface.

It should be understood that when PIDs (packet IDs) of a packet of service information used to transfer EPG (Electrical Program Guide) and the like are recognized in advance, these PIDs are also set to the PID filter 11, and the packet of these PIDs is also filtered out from this PID filter 11.

Then, the transport packet which is extracted by the PID filter 11 in this manner is supplied to the counter 24, the stream analyzing unit 12, and the time stamp adding unit 15. The counter 24 counts a total number of packets defined from a head packet of a transport stream to be recorded and a present packet, and then senses the present packet number. This sensed present packet number is supplied by this counter 24 to both the time unit map forming unit 23 and the entry point map forming unit 16.

Also, the stream analyzing unit 12 extracts a PCR (Program Clock Reference) from the entered transport packet, and then supplies the extracted PCR to the PLL unit 13. The PLL unit 13 generates the clock having the frequency of 27 MHz in synchronism with the entered PCR, and supplies this clock to the time stamp generating unit 14.

The time stamp generating unit 14 counts the entered clock to produce a time stamp corresponding to this count value. The time stamp adding unit 15 adds the time stamp to the transport packet entered from the PID filter 11, and then supplies the source packet to the file system unit 17. This time stamp indicates an arrival time instant of this transport packet, and is generated from the time stamp generating unit 14.

The time unit map forming unit 23 forms the time unit map based upon both the packet number entered from the counter 24 and the time stamp entered from the time stamp generating unit 14, and then supplies the formed time unit map to the entry point map forming unit 16 and the file system unit 17. In this time unit map, as indicated in FIG. 7, the addresses time_unit_address every time unit are made in correspondence with the addresses delta_time_unit_address every time unit. Also, the time unit map forming unit 23 forms another time unit map as shown in FIG. 22D, and then supplies this time unit map to the entry point map forming unit 16 and the file system 17. In this time unit map, the head data addresses RSPN_time_unit_start are made in correspondence with the time units.

Further, the stream analyzing unit 12 supplies the above-explained program information every program to the entry point map forming unit 16.

Figure 29:
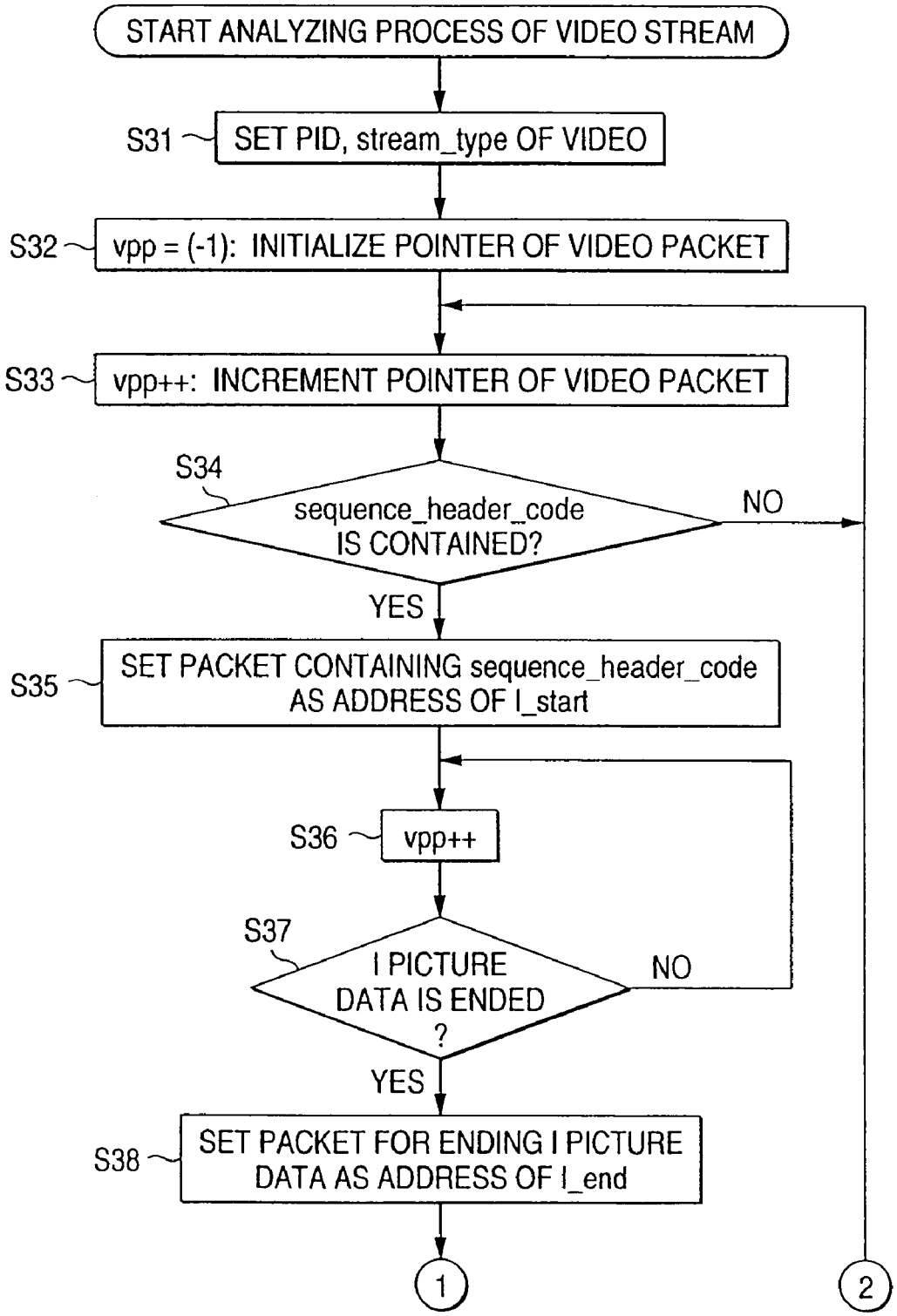
FIG. 29 is a flow chart for describing a recording operation of the moving picture recording apparatus shown in FIG. 27.
Figure 30:
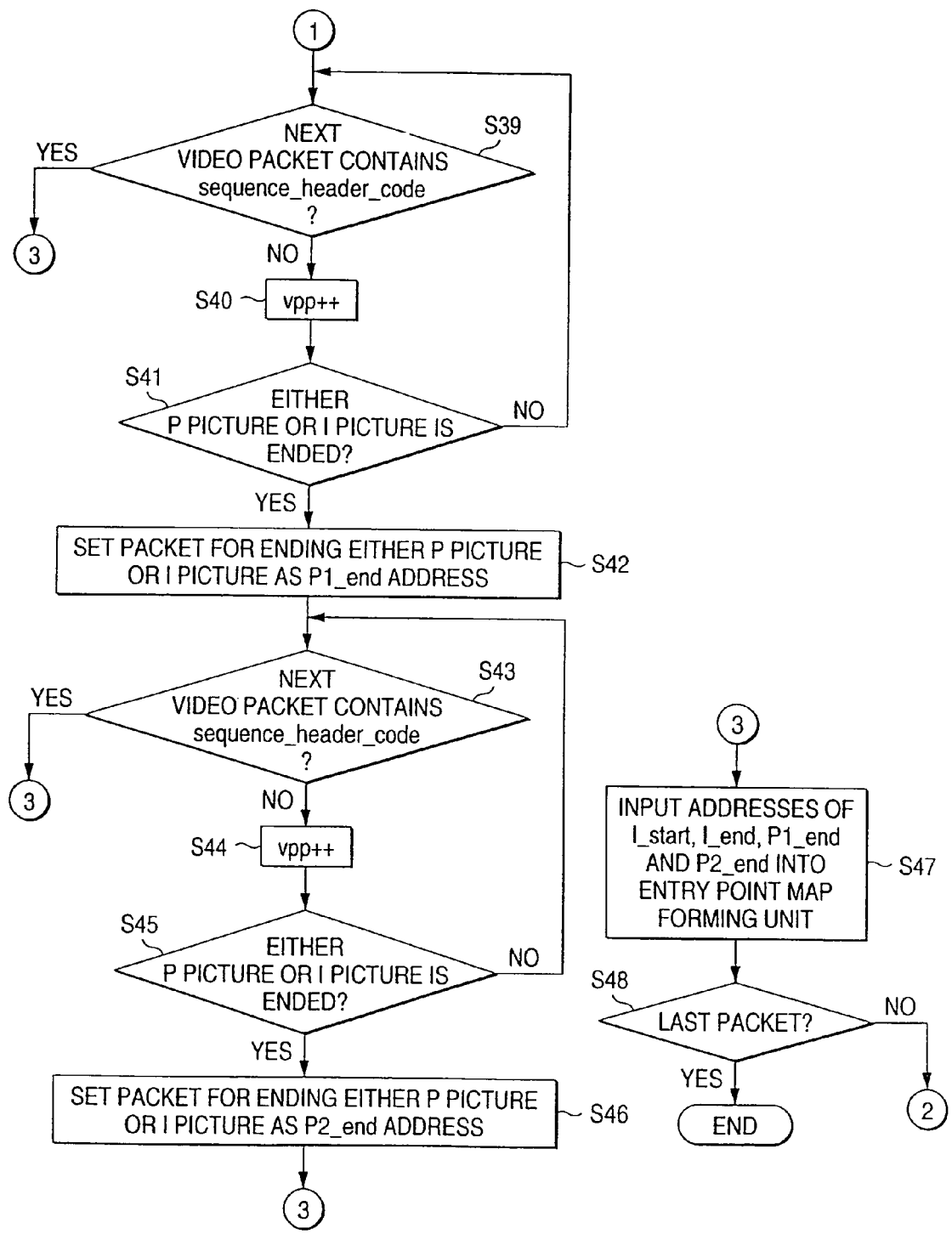
FIG. 30 is a flow chart for describing a recording operation of the moving picture recording apparatus shown in FIG. 27.

As a result, the stream analyzing unit 12 executes a process operation for analyzing an entry point as explained in flow charts shown in FIG. 29 and FIG. 30.

At a step S31 of this analyzing process flow chart shown in FIG. 29, the stream analyzing unit 12 sets both a PID of video data of a program to be recorded, and stream-type thereof to the PID filter 11. As a result, the designated packet of the video data is supplied from the PID filter 11 to the stream analyzing unit 12.

At a step S32, the stream analyzing unit 12 initializes a pointer "vpp" of a video packet, namely vpp=0. This pointer vpp indicates an order (sequence) of a video packet of the above-described PID under process.

At a step S33, the stream analyzing unit 12 increments the pointer vpp of the video packet, for instance, increments this pointer by 1.

At a step S34, the stream analyzing unit 12 checks as to whether or not a code sequence-header-code of MPEG video data (namely, code having a bit length of 32 bits and indicated by "0X000001B3") is contained in a stream of a payload. When this code sequence_header_code is not contained in the stream, this video stream analyzing process operation is returned to the previous step S33.

To the contrary, when the stream analyzing unit 12 judges at the step S34 that the code sequence_header_code is contained in the payload, this analyzing process operation is advanced to a step S35. At this step S35, the stream analyzing unit 12 sets an address of a packet (namely, packet of first I picture) containing this code sequence_header_code to an address "I_start_address" (see FIG. 10).

At a step S36, the stream analyzing unit 12 increments the pointer vpp of the video packet.

At the next step S37, the stream analyzing unit 12 checks as to whether or not the data of the above-described I picture is ended. When the data of this I picture is not yet accomplished, the analyzing process operation is returned to the step S36. When the data of the I picture is ended, the analyzing process operation is advanced to a further step S38.

At this step S38, the stream analyzing unit 12 sets an address of a packet when the I picture is ended to "I_end_address" (see FIG. 10). With execution of the above-described analyzing process operation, the address of the first I picture is determined.

At a step S39 (while video pointer vpp is not incremented), the stream analyzing unit 12 checks as to whether or not a next video packet contains a sequence header code. When the stream analyzing unit 12 judges that the next video packet contains the sequence header code, the analyzing process operation is advanced to a step S47. To the contrary, when the stream analyzing unit 12 judges that the next video packet does not contain the sequence header code, the analyzing process operation is advanced to a step S40.

At the step S40, the stream analyzing unit 12 increments the pointer vpp of the video packet.

At the next step S41, the stream analyzing unit 12 checks as to whether or not the above-described I picture, or P picture is ended. When the P picture, or the I picture is not yet accomplished, the analyzing process operation is returned to the previous step S39. When the P picture, or the I picture is ended, the analyzing process operation is advanced to a step S42.

At this step S42, the stream analyzing unit 12 sets an address of a packet when the P picture, or the I picture is ended to "P1_end_address" (see FIG. 10). With execution of the above-described analyzing process operation, the address of the first I picture, or P picture subsequent to the I picture is determined.

At a step S43 (while video pointer vpp is not incremented), the stream analyzing unit 12 checks as to whether or not a next video packet contains a sequence header code. When the stream analyzing unit 12 judges that the next video packet contains the sequence header code, the analyzing process operation is advanced to the step S47. To the contrary, when the stream analyzing unit 12 judges that the next video packet does not contain the sequence header code, the analyzing process operation is advanced to a step S44.

At the step S44, the steam analyzing unit 12 increments the pointer vpp of the video packet.

At the next step S45, the stream analyzing unit 12 checks as to whether or not the P picture, or the I picture is ended. When the P picture, or the I picture is not yet accomplished, the analyzing process operation is returned to the step S43. When the P picture, or the I picture is ended, the analyzing process operation is advanced to a further step S46.

At this step S46, the stream analyzing unit 12 sets an address of a packet when the P picture, or the I picture is ended to "P2_end_address" (see FIG. 10). With execution of the above-described analyzing process operation, the address of either the P picture, or the I picture located at two next positions of the I picture.

At a step S47, the stream analyzing unit 12 outputs the address I_start_address, the address I_end_address, and the address P1_end_address and the address P2_end_address to the entry point map forming unit 16. At this time, there are some possibilities that at least one of the address P1_end_address and the address P2_end_address is not present.

At a step S48, the stream analyzing unit 12 judges as to whether or not the present packet corresponds to a finally entered packet. When the stream analyzing unit 12 judges that the present packet is not the finally entered packet, the analyzing process operation is returned to the step S33. To the contrary, when the present packet corresponds to the finally-inputted packet, the analyzing process operation is accomplished.

In such a case that a plurality of programs are contained in the transport stream to be recorded, the above-explained analyzing operation of the video stream is carried out with respect to the video packet of the respective programs.

When the stream analyzing unit 12 produces the entry point data in accordance with the above-described manner, the stream analyzing unit 12 supplies this entry point data to the entry point map forming unit 16. The entry point map forming unit 16 processes the entry point data supplied from the stream analyzing unit 12 to form a table with respect to each of the programs, and then forms an entry point map as indicated in FIG. 9, which will be supplied to the file system unit 17.

As a result, the transport stream added with the time stamp by the time stamp adding unit 15, the time unit map and the entry point map, functioning as feature point data indicative of a feature point of this transport stream are supplied from the time unit map forming unit 23 and the entry point map forming unit 16 to the file system unit 17, respectively. The file system unit 17 processes the transport stream and the feature point data corresponding thereto as a file.

Figure 31:
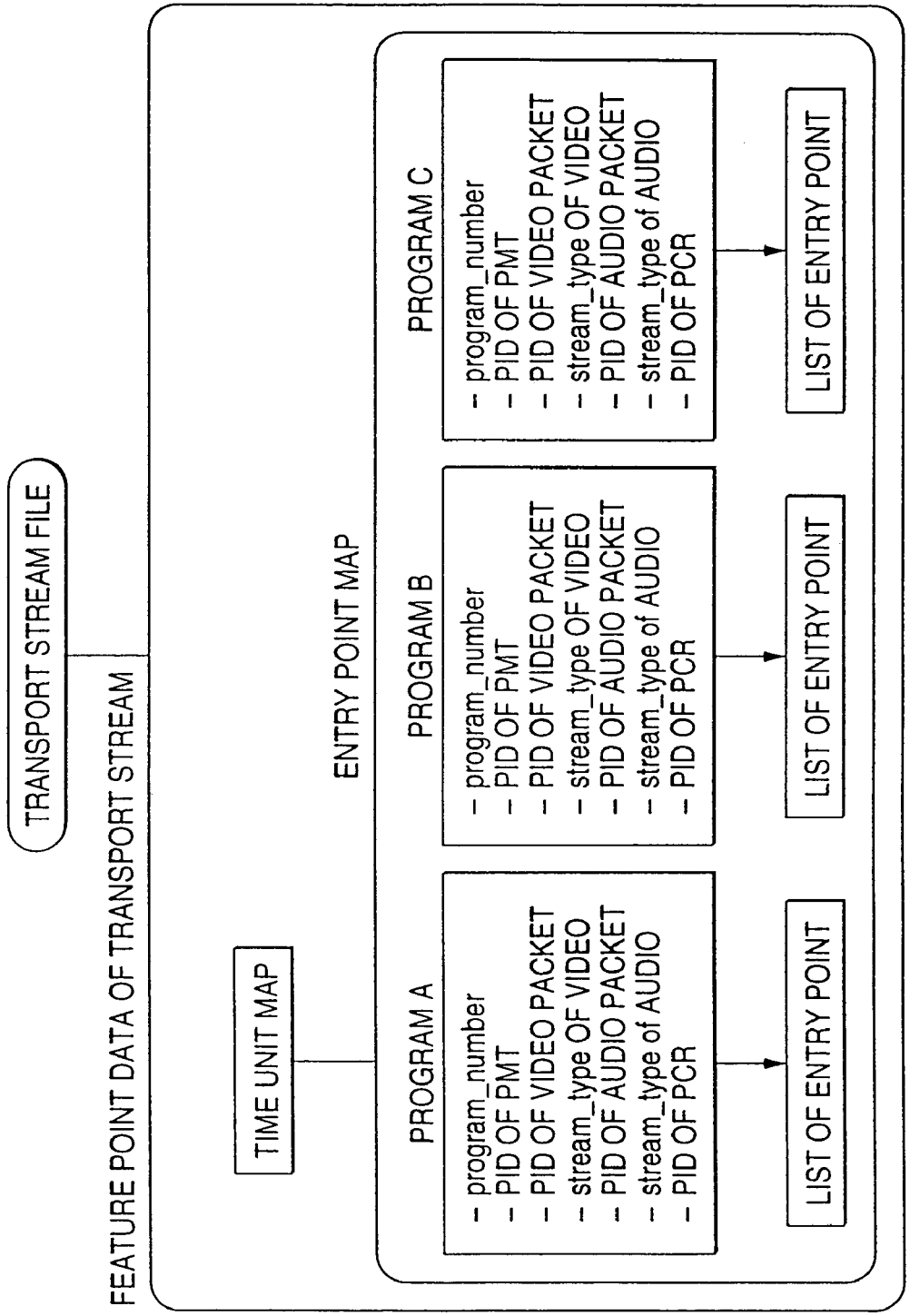
FIG. 31 is an explanatory diagram for explaining a relationship between a time unit map and an entry point map of a transport stream file.

FIG. 31 represents an example of this file structure. In this file structural example, three sets of programs are multiplexed within the transport stream file. As shown in this drawing, the entry point map is constituted in such a manner that this entry point map follows the time unit map. Then, each of the entry point maps owns the below-mentioned data every program:

(1) program_number of a program;
(2) a PID of a transport packet of a PMT of a program;
(3) both a PID and stream_type of a transport packet of video data which constitutes a program;
(4) both a PID and stream_type of a transport packet of audio data which constitutes a program;
(5) a PID of a PCR of a program; and
(6) a list of an entry point.

The file produced by the file system unit 17 is supplied to the error correcting unit 18. After an error correction code is added to this produced file, the resulting file is supplied to the modulating unit 19 so as to be modulated by a preselected modulating system. A signal outputted from the modulating unit 19 is supplied to the writing unit 20, so that this supplied signal is written into the recording medium 21.

Both the transport stream and the feature point data thereof are recorded on the recording medium 21 in the above-described manner.

Modification of Moving Picture Recording Apparatus

Figure 32:
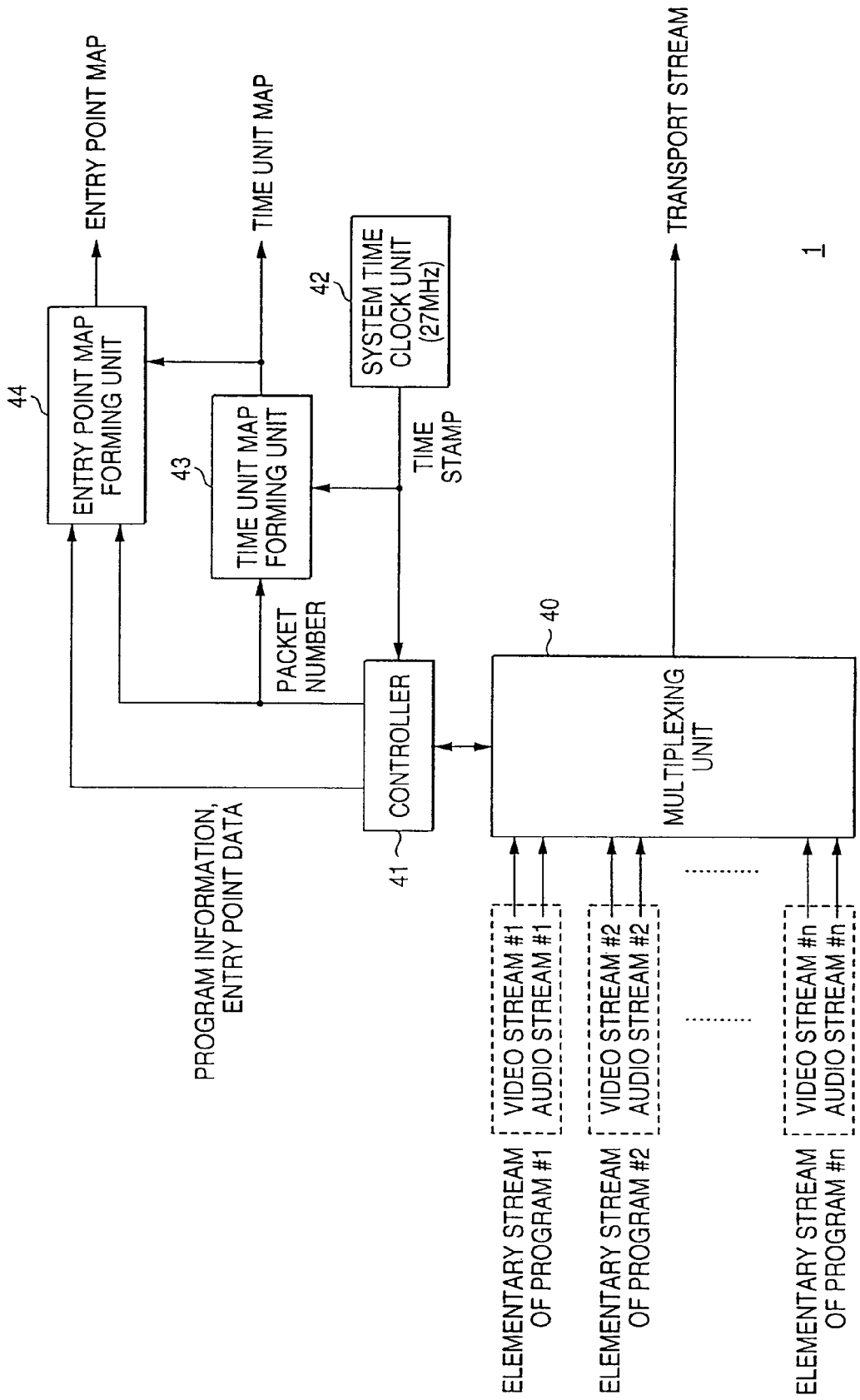
FIG. 32 is a schematic block diagram for indicating another structural example of a moving picture recording apparatus to which the present invention is applied.

In the above-described embodiment, both the time unit map and the entry point map are formed from the transport stream. Alternatively, for instance, in such a case that the moving picture recording apparatus itself multiplexes transport streams to produce a multiplexed transport stream, this moving picture recording apparatus may produce both a time unit map and an entry point map during this multiplexing operation. FIG. 32 indicates a structural example of this alternative case.

In other words, in the structural example of FIG. 32, elementary streams #1 to #n of video data and elementary streams #1 to #n of audio data of a plurality ("n" pieces) of programs are inputted to a multiplexing unit 40. A system time clock unit 42 counts a system time clock having a frequency of 27 MHz, produces a time stamp, and then outputs the time stamp to both a controller 41 and a time unit map forming unit 43. The controller 41 analyzes the respective elementary streams which are inputted to the multiplexing unit 40, and controls this multiplexing unit 40 in such a manner that the multiplexing unit 40 multiplexes the transport streams while satisfying the T-STD (Transport Stream System target Decoder) of the MPEG system rules.

The controller 41 supplies a packet number indicative of a total number of transport packets, which is derived from the multiplexing unit 40, to both a time unit map forming unit 43 and an entry point map forming unit 44. The time unit map forming unit 43 forms a time unit map based upon the packet number inputted from the controller 41 and the time stamp inputted from the system time clock 42.

Also, the controller 41 supplies program information and entry point data to the entry point map forming unit 44. The entry point map forming unit 44 forms an entry point map based upon the packet number, the program information, and the entry point data, which are supplied form the controller 41, and also the time unit map supplied from the time unit map forming unit 43.

The transport steam derived from the multiplexing unit 40, the time unit map formed by the time unit map forming unit 43, and the entry point map formed by the entry point map forming unit 44 are supplied to the file system unit 17 shown in FIG. 27, respectively. It should also be noted that the arrangement defined from this file system unit 17 to the recording medium 21 is similar to that shown in FIG. 27.

In the moving picture recording apparatus 1 with employment of the arrangement as shown in FIG. 32, the controller 41 produces both program information and entry point data from the elementary stream multiplexed by the multiplexing unit 40, and then supplies these program information and entry point data to the entry point map forming unit 44. Also, the controller 41 supplies the packet number to both the time unit map forming unit 43 and the entry point map forming unit 44. This packet number corresponds to the time stamp entered from the system time clock unit 42.

The time unit map forming unit 43 forms the time unit map based upon the packet number entered from the controller 41 and also the time stamp entered from the system time clock 42. Similarly, the entry point map forming unit 44 forms the entry point map based upon the packet number, the program information, and the entry point data, which are entered from the controller 41, and furthermore, the time unit map entered from the time unit map forming unit 43.

Similar to the arrangement shown in FIG. 27, the formed transport stream, time unit map, and entry point map are processed by the file system unit 17 as a file, and then, an error correction portion is added thereto by the error correcting unit 18. Then, the error-corrected transport stream/time unit map/ entry point map are furthermore modulated by the modulating unit 19. Thereafter, the modulated transport stream/time unit map/entry point map are recorded on the recording medium 21 by the writing unit 20.

Arrangement of Moving Picture Reproducing Apparatus

Figure 33:
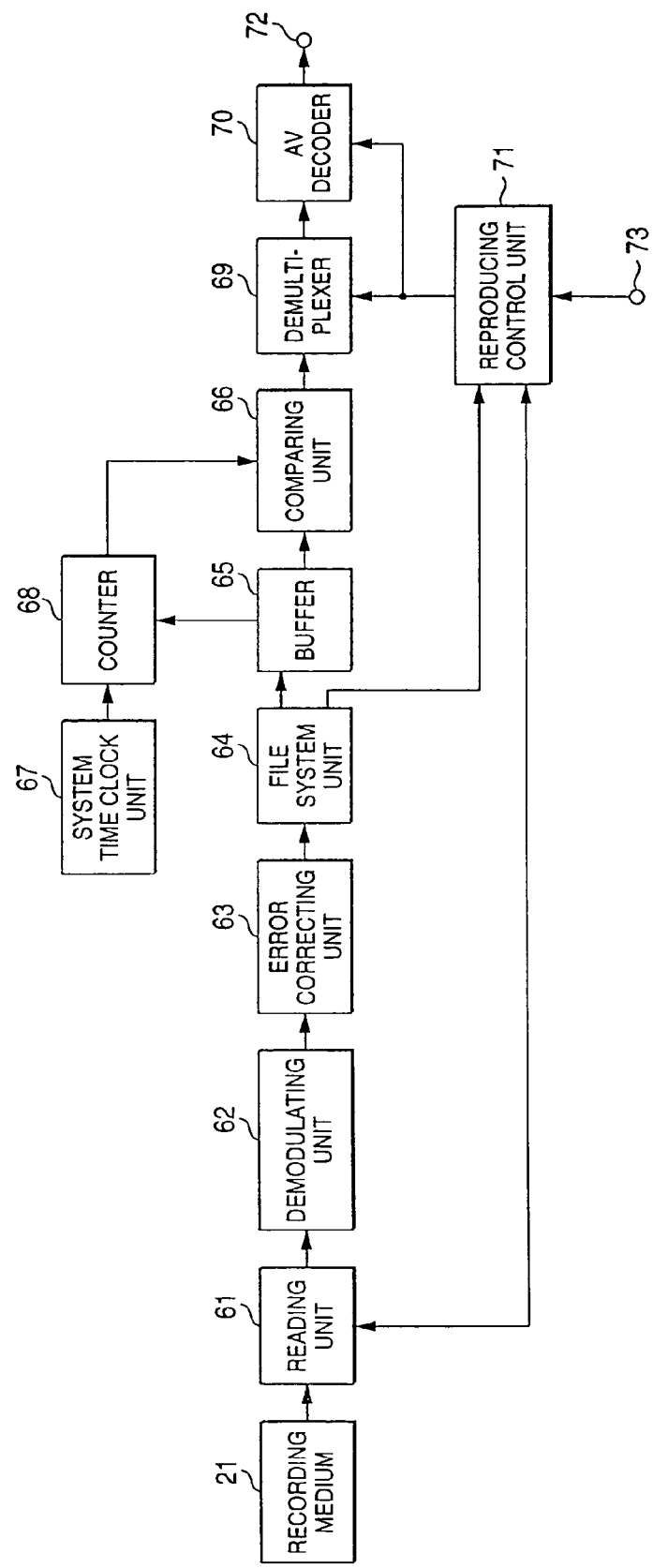
FIG. 33 is a schematic block diagram for showing a structural example of a moving picture reproducing apparatus to which the present invention is applied.

Next, a description will now be made of a moving picture reproducing apparatus for reproducing the recording medium 21 on which the transport stream file and the feature point data of this transport stream file have been recorded in the above-described manner. FIG. 33 indicates a structural example of such a moving picture reproducing apparatus 51. In this moving picture reproducing apparatus 51, a reading unit 61 reads the data recorded on the recording medium 21, and then outputs the read data to a demodulating unit 62. The demodulating unit 62 demodulates the data entered from the reading unit 61, and then outputs the demodulated data to an error correcting unit 63. The error correcting unit 63 corrects an error contained in the data inputted from the demodulating unit 62, and then supplies the error-corrected data to a file system unit 64.

The file system unit 64 separates the data entered from the error correcting unit 63 into both a transport stream file and feature point data, and then supplies this stream file to a buffer 65 and also this feature point data to a reproducing control unit 71. The reproducing control unit 71 controls the reading unit 61, a demultiplexer 69, and an AV decoder 70 in response to an instruction. This instruction is entered by a user via a terminal 73 and a user interface.

The buffer 65 supplies such a value saved from the stream file in arrival_time_stamp as an initial value to a counter 68 so as to set this counter 68. The counter 68 counts a clock having a frequency of 27 MHz, while using the initial value derived from the buffer 65 as the reference value, and then supplies the count value to a comparing unit 66. This clock is generated from the system time clock unit 67.

The comparing unit 66 compares the count value supplied from the counter 68 with the value arrival_time_stamp contained in the transport packet supplied from the buffer 65. When this count value is made coincident with the value arrival_time_stamp, the comparing unit 66 outputs this transport packet to the demultiplexer 69.

The demultiplexer 69 extracts both video data and audio data of such a channel corresponding to an instruction issued from the reproducing control unit 71 from the transport stream file entered from the comparing unit 66, and then outputs both the extracted video data and the extracted audio data to an AV decoder 70. The AV decoder 70 decodes both the video data and the audio data, which are inputted from the demultiplexer 69, and then outputs the decoded video/audio data from a terminal 72.

Reproducing Operation of Moving Picture Reproducing Apparatus

Subsequently, a reproducing operation of the moving picture reproducing apparatus will now be explained. Both the transport stream file and the feature point data of this transport stream recorded in the moving picture recording apparatus 1 shown in FIG. 27, or FIG. 32 are recorded on the recording medium 21. In this transport stream file, either one program or a plurality of programs are multiplexed.

First, the reproducing control unit 71 instructs the reading unit 61 to read out the feature pint data from the transport stream file. At this time, the reading unit 61 reads out the feature point data of the transport stream from the reading medium 21, and then outputs the read feature point data to the demodulating unit 62. The demodulating unit 62 demodulates the inputted feature point data, and then outputs the demodulated data to the error correcting unit 63. The error correcting unit 63 corrects the error of the entered data, and then supplies the error-corrected data to the file system unit 64. The file system unit 64 supplies the entered stream feature point data to the reproducing control unit 71.

The program number is inputted from the terminal 73 into the reproducing control unit 71. This program number is designated to be reproduced by the user interface. The reproducing control unit 71 reads out from the feature point data, a PID of a transport packet of a PMT of this designated program; a PID and stream-type of a transport packet of video data which constitutes this program; a PID and stream-type of a transport packet of audio data which constitutes this program; and a PID of a PCR. Thereafter, the reproducing control unit 71 outputs the read items to both the demultiplexer 69 and the AV decoder 70.

Furthermore, the reproducing control unit 71 instructs the reading unit 61 to read out the transport stream file. In response to this instruction, the reading unit 61 reads the transport stream file from the recording medium 21. Similar to the above-explained case, this data about the transport stream file is processed by the demodulating unit 62, the error correcting unit 63, and the file system unit 64 to the buffer 65.

The buffer 65 reads out the value stored in arrival_time_stamp from the inputted transport stream file, and supplies the read value as the initial value to the counter 68 so as to set this counter 68. Then, the counter 68 counts the clock generated from the system time clock unit 67 while using this initial value as the reference value, and then supplies this count value to the comparing unit 66. The comparing unit 66 reads out the value of arrival_time_stamp from the transport stream file supplied from the buffer 65, and then compares this read value with the counter value supplied from the counter 68. At such timing when the read data is made coincident with the count value, the comparing unit 66 outputs the transport stream file to the demultiplexer 69.

The demultiplexer 69 separates the transport packet of the video data and the transport packet of the audio data, which constitute the program designated by the user interface, from the inputted transport stream. Then, the demultiplexer 69 enters these separated transport packets of the video/audio data into the AV decoder 70. The AV decoder 70 decodes both the video stream and the audio stream, and then outputs these decoded streams as a reproduced video signal and a reproduced audio signal from the terminal 72.

When the random access reproducing operation is instructed via the user interface, the reproducing control unit 71 determines a data reading position with respect to the recording medium 21 in response to the content of the feature point data of the stream stored therein, and then enters random access control information to the reading unit 61. For example, in the case that a program selected by a user is reproduced from a preset time instant, the reproducing control unit 71 calculates an address of a transport stream corresponding to a designated time instant, and then instructs the reading unit 61 to read the data at this calculated address from the recording medium 21. Next, this data reading sequential operation is described as follows:

A first explanation is made of the time unit map indicated in FIG. 7. Assuming now that a time instant of head data of a zeroth time unit TU0 is equal to "start_time", a time instant of head data of an N-th time unit (N>0) becomes:

(start_time+first_time_unit_size+(N−1)*time_unit_size). As a result, the following fact can be revealed. That is, if the reproducing control unit 71 can grasp such a number of a time unit in which a time instant of head data of a time unit becomes larger than a time instant designated by the user, then the reading unit 61 may read data from the time unit having this grasped number.

In this case, assuming now that an address of the head data of the zeroth time unit on the recorded stream is equal to 0, an address "time_unit_address (N)" of the head data of the N-th time unit may be calculated by the below-mentioned formula (1):

$$\text{time\_unit\_address}(N) = \sum_{i=0}^{N-1} \text{delta\_time\_unit\_address}(i) \qquad \text{Equation 1}$$

Next, a description is made of the time unit map indicated in FIG. 22D.

In this case, a time instant of head data of N-th (N>=0) time unit becomes (offset_time+N*time_unit_size). As a result, the following fact can be revealed. That is, if the reproducing control unit 71 can grasp such a number of a time unit in which a time instant of head data of a time unit becomes larger than a time instant designated by the user, then the reading unit 61 may read data from the time unit having this grasped number. A source packet number of the head data of the N-th time unit becomes:

(RSPN_time_unit_start (N)−offset_SPN). In this case, symbol "RSPN_time_unit_start (N) indicates a value of "RSPN_time_unit_start" as to the N-the time unit.

Also, in such a case that there is such data of an entry point map corresponding to a program selected by a user, the reproducing control unit 71 controls a special reproducing operation based upon entry point data. For instance, in the case of the high speed reproducing operation, the reproducing control unit 71 instructs the reading unit 61 in such a manner that stream data at addresses every entry point are sequentially and continuously read.

Special Reproducing Mode

Figure 34:
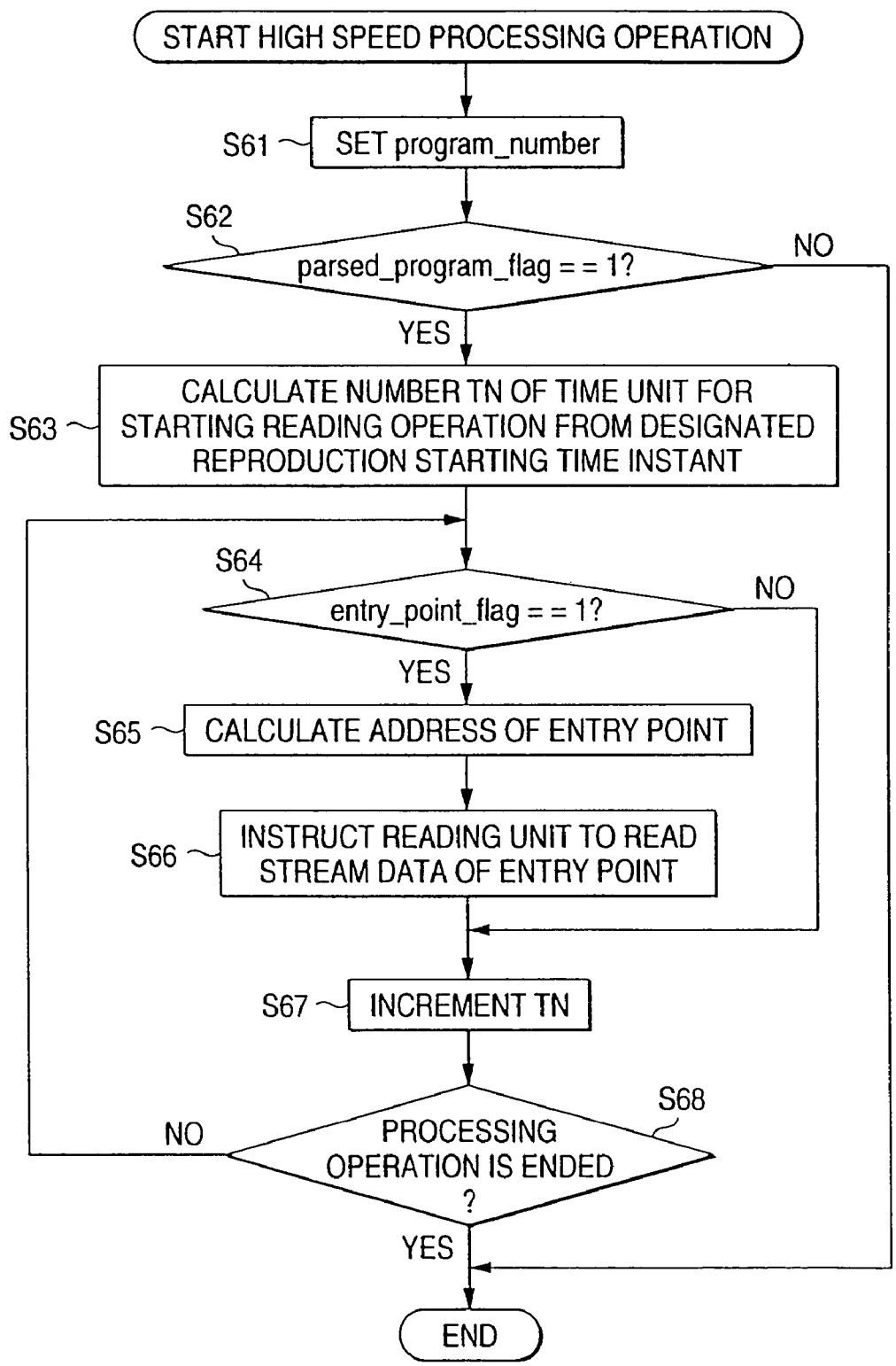
FIG. 34 is a flow chart for describing a reproducing operation of the moving picture reproducing apparatus shown in FIG. 33.

FIG. 34 is a flow chart for describing special reproducing operation carried out by the reproducing control unit 71 of the moving picture reproducing apparatus 51. In response to an instruction issued from a user, the reproducing control unit 71 sets program-number of such a program to be reproduced into an internal memory of this reproducing control unit 71 at a step S61.

At a step S62, the reproducing control unit 71 checks as to whether or not entry point data of this program is present based upon a flag "parsed_program_flag." When this entry point data is present (namely, parsed_program_flag=1), the high speed processing operation is advanced to a further step S63. To the contrary, when the entry point data is not present, since the reproducing control unit 71 cannot access the data by using the entry point map, this high speed reproducing operation is ended.

At a step S63, the reproducing control unit 71 calculates such a number "TN" of a time unit by which a data reading operation is commenced from a time instant designated by the user. In other words, in the case of such a time unit map indicated in FIG. 7, a calculations made of such a number "TN" of a time unit when a value of (start_time+first_time_unit_size+(N−1)*time_unit_size), namely a time instant of head data of a time unit becomes larger than the designated time instant. Also, in the case of such a time unit map indicated in FIG. 22D, a calculation is made of such a number "TN" of a time unit when a value of (offset_time+N*time_unit_size) becomes larger than the designated time instant.

The reproducing control unit 71 checks as to whether or not an entry point of this program is present in a TN-th time unit based upon a flag entry_point_flag at a step S64. When the entry point is present (namely, entry point_flag=1), the special reproducing operation is advanced to a step S65. When the entry point is not present, the special reproducing operation is advanced to a step S67.

In the case that such an entry point is present, the reproducing control unit 71 calculates an address which is used to read stream data of the entry point from entry_point_data ( ). A starting address when the stream data reading operation is commenced is "I_start_address", whereas an end address when the stream data reading operation is ended is "I_end_address", "P1_end_address", or "P2_end_address."

The reproducing control unit 71 instructs the reading unit 61 to read out stream data of an entry point based upon the address calculated at the previous step S65 (step S66). Then, the reading unit 61 executes a reading operation in response to this instruction.

The reproducing control unit 71 increments the number TN at a step S67. The reproducing control unit 67 judges as to whether or not a completion of this special reproducing operation is instructed at a step S68. When such a completion of the special reproducing operation is not yet instructed, this reproducing operation is returned to the step S64. To the contrary, when such a completion of the special reproducing operation is instructed, this reproducing operation is ended.

The reading unit 61 reads out data from the designated random access point. The read data is entered into the demultiplexer 69 after being processed by the demodulating unit 62, the error correcting unit 63, the file system unit 64, the buffer 65, and the comparing unit 66. The demultiplexed data is decoded by the AV decoder 70, and then the AV decoder 70 outputs the decoded data.

The above-explained calculation process operation defined at this step S63 will now be described more in detail in the case of the time unit map shown in FIG. 7 with reference to flow charts indicated in FIG. 35 and FIG. 36. At a step S81 of the flow chart shown in FIG. 35, when both program-number and a reproduction starting time instant "Tst" are entered from the terminal 73 to the reproducing control unit 71, the reproducing control unit 71 judges as to whether or not the reproducing starting time instant Tst entered at the step S81 is equal to the starting time instant "start_time" (FIG. 3B) of the transport stream contained in the feature point data at a step S82. When the reproduction starting time instant Tst is equal to the starting time "start_time", the process operation is advanced to a step S86. At this step S86, the reproducing control unit 71 sets "0" to a variable "N" indicative of a number of a time unit, and also sets "0" to an address "time_unit_address (N)" of this time unit (namely, zeroth time unit).

To the contrary, when the reproducing control unit 71 judges that the reproduction starting time instant Tst is not equal to the starting time instant "start_time", at the step S82, the process operation is advanced to a further step S83. At this step S83, the reproducing control unit 71 reads a header portion of the time unit map, and then calculates such a minimum value "IN" capable of satisfying the below-mentioned inequality:

$$Tst \leq \text{start\_time} + \text{first\_time\_unit\_size} + (N-1) \times \text{time\_unit\_size}$$

At a step S85, the reproducing control unit 71 calculates time_unit_address (N) based on the data of the time unit map in accordance with the formula (1).

When a calculation is made of a time instant "time_unit_address (N)" of the head data in the N-th time unit, the reproducing control unit 71 instructs the reading unit 61 to read data from the address "time_unit_address (N)" of the N-th time unit at step S87.

In response to an instruction issued from the reproducing control unit 71, the reading unit 61 reads out a transport stream from this address "time_unit_address (N)" from the recording medium 21 at a step S88. The data (transport stream) read by this reading unit 61 is supplied via the demodulating unit 62, the error correcting unit 63, the file system unit 64, the buffer 65, and the comparing unit 66 to the demultiplexer 69.

At a step S89, the reproducing control unit 71 outputs to the demultiplexer 69, program_number of such a program to which the user instructs to reproduce. At a step S90, the demultiplexer 69 separates a transport packet of the program at program_number instructed by the reproducing control unit 71, and then outputs this separated transport packet to the AV decoder 70. At a step S91, the Av decoder 70 decodes the data entered from the demultiplexer 69, and then outputs the decoded data from the terminal 72.

Referring now to a flow chart shown in FIG. 37, the calculation process operation defined at the step S63 of the flow chart shown in FIG. 34 will be described more in detail in the case of the time unit map shown in FIG. 22D.

Figure 35:
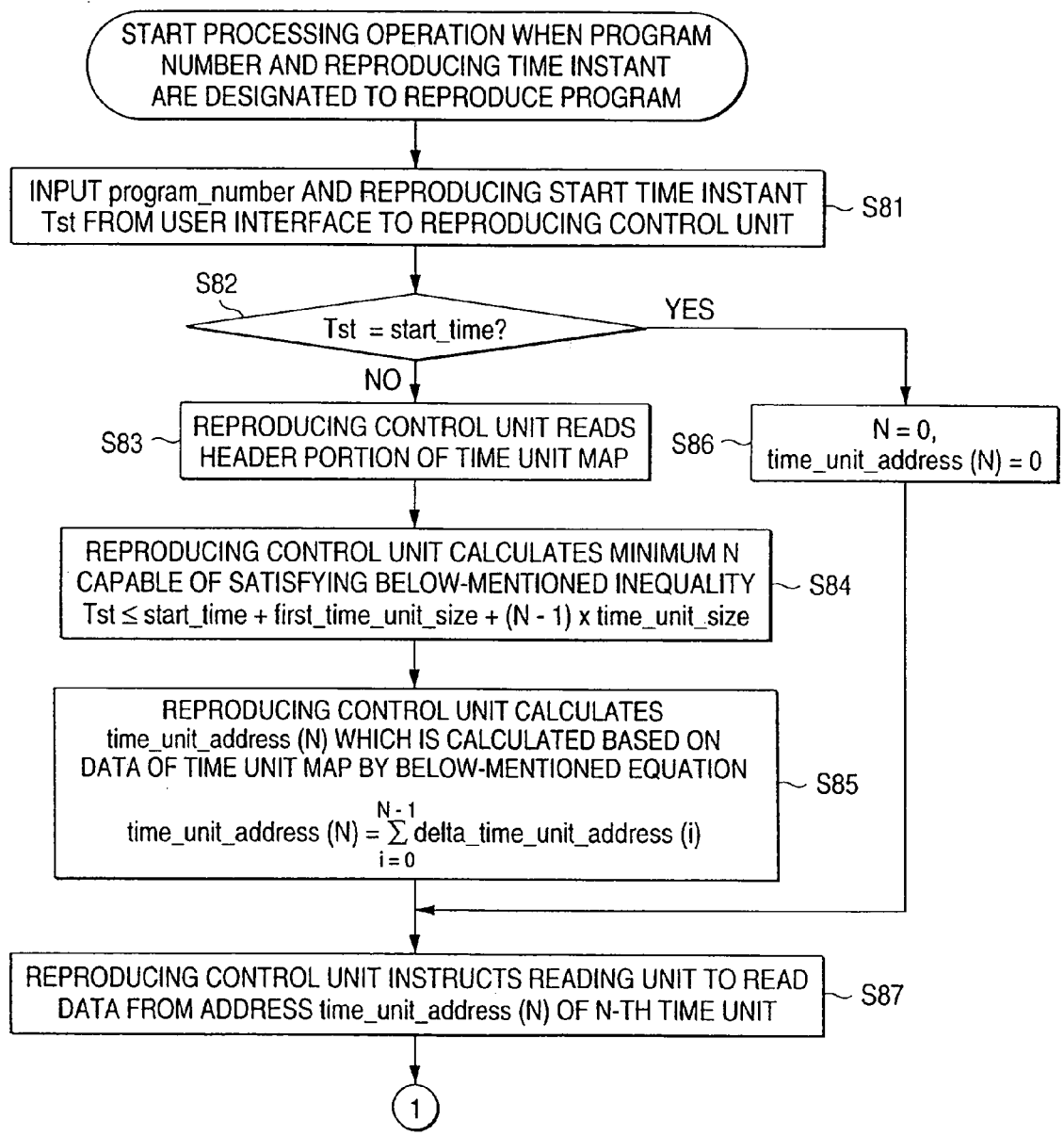
FIG. 35 is a flow chart for describing a reproducing operation of the moving picture reproducing apparatus shown in FIG. 33.
Figure 36:
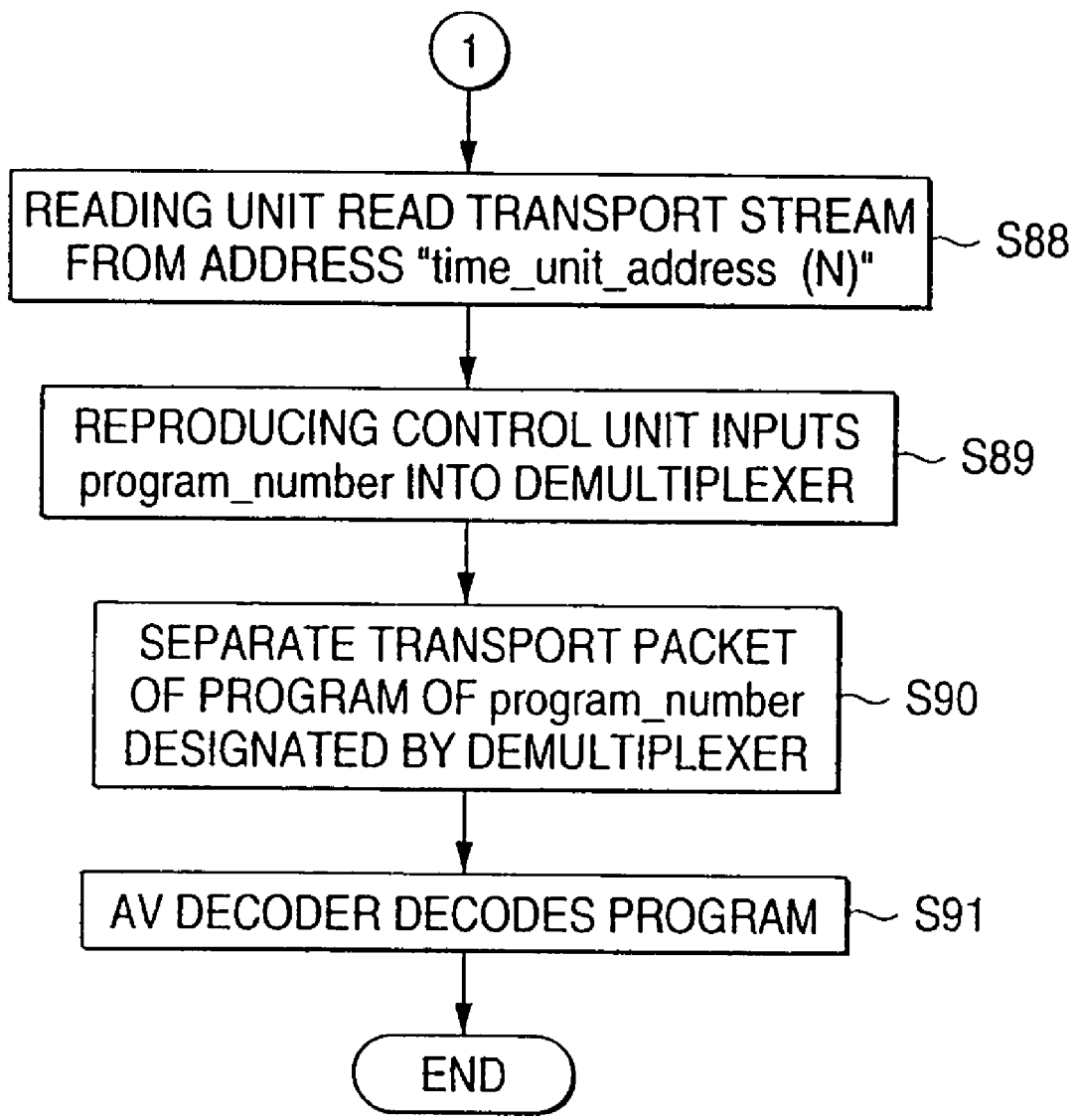
FIG. 36 is a flow chart for describing a reproducing operation of the moving picture reproducing apparatus shown in FIG. 33.
Figure 37:
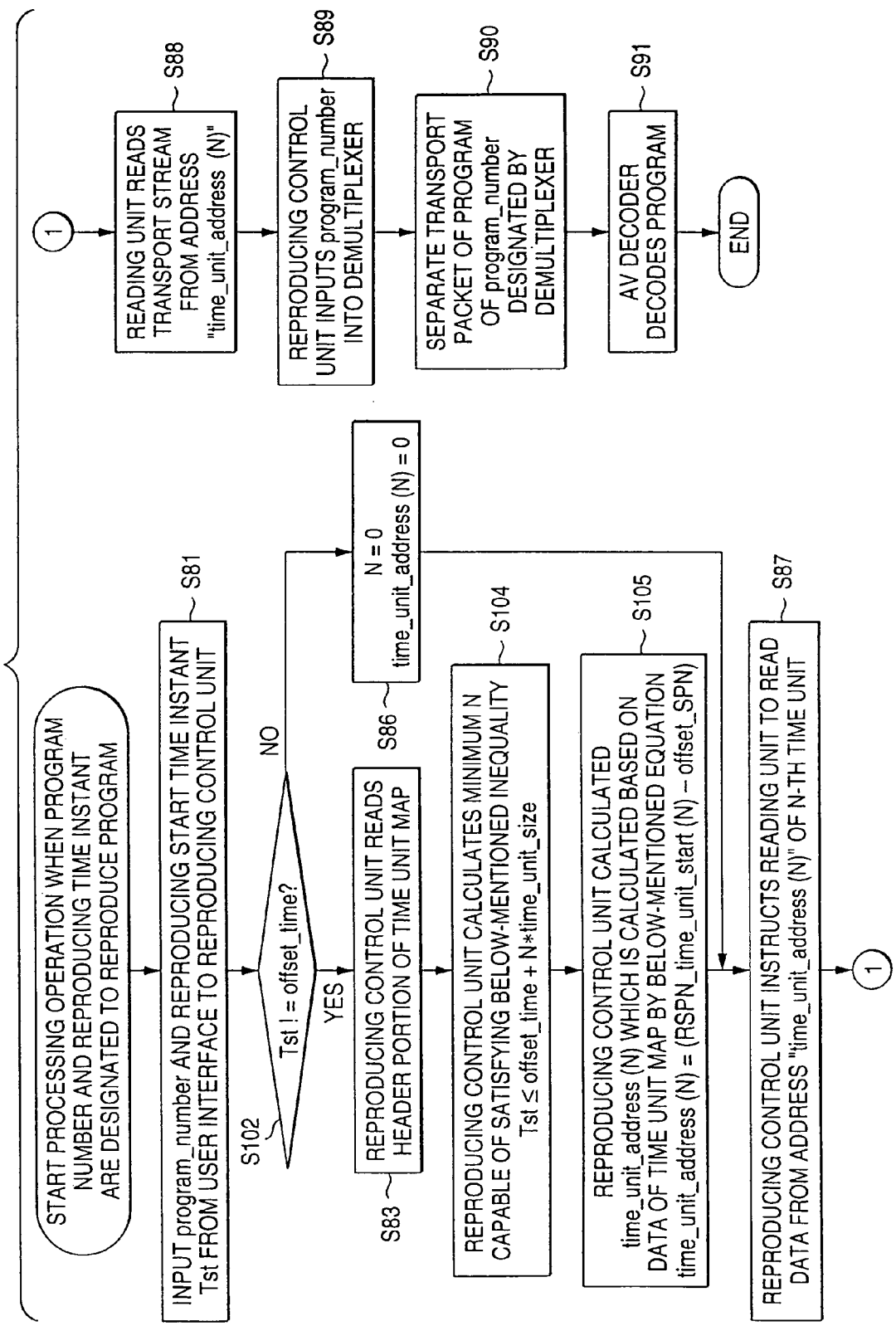
FIG. 37 is a flow chart for describing a reproducing operation of the moving picture reproducing apparatus shown in FIG. 33.

The process steps of the flow chart indicated in FIG. 37 are made in such a manner that the step S82, S84, S85 defined in the flow charts of FIG. 35 and FIG. 36 are changed into steps S102, S104, and S105, respectively. Other steps than the above-explained steps defined in the flow chart of FIG. 37 are equal to the steps defined in the above-explained flow charts of FIG. 35 and FIG. 36. Only the respective changed steps S102, S104, and S105 will now be explained as follows:

At the step S102, the reproduction starting time instant Tst is compared with a starting time "offset_time" of a time unit map.

At a step S104, a calculation is made of a minimum value "N" capable of satisfying the below-mentioned inequality:

Tst<=offset_time+N*time_unit_size

At the step S85, the reproducing control unit 71 calculates an address "time_unit_address (N)" based upon the data of the time unit map in accordance with the below-mentioned formula:

time_unit_address (N)=RSPN_time_unit start (N)−offset_SPN.

It should be understood that a series of the above-described process operations may be executed by using hardware, but also may be executed by utilizing software. In the case that a series of the above-explained process operations is executed by employing software, the following cases may be conceived. That is, such a computer may be employed in which a program for constituting this software is installed in a moving picture recording/reproducing apparatus functioning as exclusively-used hardware, and a general-purpose computer capable of executing various sorts of functions may be employed, while various sorts of programs are installed.

Referring now to FIG. 38, a recording medium according to an embodiment mode of the present invention will be explained. That is to say, while a program capable of executing a series of the above-described process operations is installed in a general-purpose personal computer, this computer program can be recorded on such a recording medium of the embodiment mode.

As indicated in FIG. 38A, the computer program may be provided under such a condition that this computer program is previously installed in either a hard disk drive (HDD) 302 or a semiconductor memory 303, functioning as a recording medium built in a computer 301.

Alternatively, as represented in FIG. 38B, the computer program may be provided as package software in such a manner that this computer program is temporarily stored, or permanently stored into a recording medium such as a floppy disk 311, a CD-ROM (Compact Disk-Read Only Memory) disk 312, an MO (Magneto-Optical) disk 313, and DVD (Digital Versatile Disk) 314, a magnetic disk 315, and a semiconductor memory 316.

Furthermore, as shown in FIG. 38C, the computer program may be transmitted from a download site 321 via a satellite 322 used in a digital satellite broadcasting system to a computer 323 in a wireless manner. Alternatively, the computer program may be transmitted from the download site 321 via a network 131 such as a local area network (LAN) and the Internet to the computer 323 in a wired line manner, and then may be stored into a hard disk drive built in this computer 323.

A recording medium defined in this specification implies such a wide conceptional idea involving all of the above-explained recording media.

It should also be noted that the steps used to describing the computer program provided from the reading medium may be apparently processed in the time sequential manner in accordance with the described sequential order, but may not be time_sequentially processed, for example, may be processed in a parallel manner, or a separate manner.

It should also be understood that the system described in this specification represents an entire apparatus arranged by a plurality of apparatuses.

As previously explained, in the case that the recording medium on which either one transport stream or a plurality of transport streams are recorded is random-accessed so as to reproduce desirable data, since the starting position of the I picture, or the audio frame can be effectively searched, the high-speed random access reproducing operation can be carried out in response to the user input.

As previous explained in detail, in accordance with the first data processing apparatus, data processing method, and the program recorded on the recording medium, the coded stream is segmented with respect to a predetermined time unit, and then such a time unit map is formed. This time unit map indicates the address of the data with respect to the time unit of the segmented coded stream. As a result, the random access operation can be carried out in high speed response.

Furthermore, in accordance with the second data processing apparatus, data processing method, and the program recorded on the recording medium, the coded stream recorded on the recording medium is reproduced from an arbitrary position based upon the time unit map reproduced from the recording medium. As a consequence, the random data stream production can be carried out in a high speed.

What is claimed is:

1. An apparatus for processing a variable bit-rate data stream, comprising:
    a source packet generator operable to generate a source packet, the source packet being composed of a data packet representative of an audio and/or picture information and an arrival time stamp indicative of an arrival time of each data packet; and
    a map generator operable to generate a time unit map, the time unit map consisting of an address of each time unit, the time unit having a predetermined common time length on the basis of the arrival time stamp.

2. The apparatus according to claim 1, wherein said map generator generates a packet number of each first data packet per every time unit.

3. The apparatus according to claim 2, further including a recording unit operable to store said data stream along with said time unit map.

4. The apparatus according to claim 1, wherein said map generator generates a plurality of time unit maps corresponding to respective programs when the data stream includes a plurality of programs.

5. An apparatus for processing a variable bit-rate data stream, comprising:
    a source packet generator operable to generate a source packet, the source packet being composed of a data packet representative of an audio and/or picture information and an arrival time stamp indicative of an arrival time of each packet; and
    a map generator operable to generate a time unit map, the time unit map consisting of an address of each time unit, the time unit having a predetermined common time length on the basis of the arrival time stamp, wherein the time unit map includes time information indicative of the arrival time of the time unit recorded first and the length of the time unit.

6. An apparatus for processing a variable bit-rate data stream, comprising:
    a source packet generator operable to generate a source packet, the source packet being composed of a data packet representative of an audio and/or picture information and an arrival time stamp indicative of an arrival time of each packet; and
    a map generator operable to generate a time unit map, the time unit map consisting of an address of each time unit, the time unit having a predetermined common time length on the basis of the arrival time stamp, wherein the time unit map includes offset information indicative of an offset value of a source packet, and wherein said address of each time unit indicates a relative number of the source packet with respect to the offset value.

7. An apparatus for processing a data stream in which a plurality of programs are multiplexed, comprising:
a filter operable to select a desired program from the data stream;
a source packet generator operable to generate a source packet, the source packet being composed of a data packet representative of an audio and/or picture information and an arrival time stamp indicative of an arrival time of each data packet; and
a map generator operable to generate a time unit map, the time unit map consisting of an address of each time unit, the time unit having a predetermined common time length on the basis of the arrival time stamp.

8. The apparatus according to claim 7, wherein said time unit map includes time information indicative of the arrival time of the time unit recorded first and the length of the time unit.

9. The apparatus according to claim 7, wherein the time unit map includes offset information indicative of an offset value of the source packet, and wherein said address of each time unit indicating a relative number of the source packet with respect to the offset value.

10. An apparatus for processing a data stream in which a plurality of programs are multiplexed, comprising:
a filter operable to select a desired program from the data stream;
a source packet generator operable to generate a source packet, the source packet being composed of a data packet representative of an audio and/or picture information and an arrival time stamp indicative of an arrival time of each data packet;
a map generator operable to generate a time unit map, the time unit map consists of an address of each time unit, the time unit having a predetermined common time length on the basis of the arrival time stamp; and
a recording unit operable to store said source packet without interval along with said time unit map on a recording medium.

11. A method of processing a variable bit-rate data stream, comprising the steps of:
a step of generating a source packet, the source packet being composed of a data packet representative of an audio and/or picture information and an arrival time stamp indicative of an arrival time of each data packet; and
a step of generating a time unit map, the time unit map consisting of an address of each time unit, the time unit having a predetermined common time length on the basis of the arrival time stamp.

12. An apparatus for reproducing a variable bit-rate data stream, comprising:
time unit map reproducing means for reproducing a time unit map of a coded stream comprised of data packets recorded on a recording medium, the time unit map consisting of an address of each time unit, said time unit having a predetermined common time length on the basis of an arrival time stamp indicative of an arrival time of each data packet in said coded stream; and
coded stream reproducing means for reproducing said coded stream recorded on the recording medium from an arbitrary position based upon said time unit map reproduced by said time unit map reproducing means; wherein each data packet of said coded stream has a header containing a time stamp generated on the basis of a program clock reference.

13. A method of reproducing a variable bit-rate data stream, comprising the steps of:
a time unit map reproducing step of reproducing a time unit map of a coded stream comprised of data packets recorded on a recording medium, the time unit map consisting of an address of each time unit, said time unit having a predetermined common time length on the basis of an arrival time stamp indicative of an arrival time of each data packet in said coded stream; and
a coded stream reproducing step of reproducing said coded stream recorded on the recording medium from an arbitrary position based upon said time unit map reproduced in said time unit map reproducing step; wherein each data packet of said coded stream has a header containing a time stamp generated on the basis of a program clock reference.

14. A computer readable storage medium containing a computer readable program containing a computer readable program having instructions that when executed by a processor process a variable bit-rate data stream, the process comprising:
a step of generating a source packet, the source packet being composed of a data packet representative of an audio and/or picture information and an arrival time stamp indicative of an arrival time of each data packet; and
a step of generating a time unit map, the time unit map consisting of an address of each time unit, the time unit having a predetermined common time length on the basis of the arrival time stamp.

15. An apparatus for processing a variable bit-rate data stream, comprising:
a receiver configured to receive a source packet and a time unit map, the source packet being composed of a data packet representative of an audio and/or picture information and an arrival time stamp indicative of an arrival time of each data packet, the time unit map consisting of an address of each time unit, the time unit having a predetermined common time length on the basis of the arrival time stamp; and
a controller configured to obtain an address of the source packet stored on a recording medium based upon the time unit map.

16. A method for processing a variable bit-rate data stream, comprising the steps of:
a step of receiving a source packet and a time unit map, the source packet being composed of a data packet representative of an audio and/or picture information and an arrival time stamp indicative of an arrival time of each data packet, the time unit map consisting of an address of each time unit, the time unit having a predetermined common time length on the basis of the arrival time stamp; and
a step of obtaining an address of the source packet stored on a recording medium based upon the time unit map.

17. An apparatus for processing a variable bit-rate data stream, comprising:
a reproduction unit configured to reproduce a source packet and a time unit map from a recording medium, the source packet being composed of a data packet representative of an audio and/or picture information and an arrival time stamp indicative of an arrival time of each data packet, the time unit map consisting of an address of each time unit, the time unit having a predetermined common time length on the basis of the arrival time stamp; and a controller configured to obtain an address of the source packet stored on a recording medium based upon the time unit map, wherein said reproducing unit reproduces the source packet in accordance with the address obtained by the controller.

18. A method for processing a variable bit-rate data stream, comprising the steps of:

a step for reproducing a source packet and a time unit map from a recording medium, the source packet being composed of a data packet representative of an audio and/or picture information and an arrival time stamp indicative of an arrival time of each data packet, the time unit map consisting of an address of each time unit, the time unit having a predetermined common time length on the basis of the arrival time stamp;

a step for obtaining an address of the source packet stored on a recording medium based upon the time unit map; and a step for controlling a reproducing position in accordance with the address obtained by the controller.

19. A computer readable storage device for storing information when read by a processor comprising:

the source packet being composed of a data packet representative of an audio and/or picture information and an arrival time stamp indicative of an arrival time of each data packet; and the time unit map consisting of an address of each time unit, the time unit having a predetermined common time length on the basis of the arrival time stamp.

* * * * *